(12) United States Patent
Lim et al.

(10) Patent No.: US 11,012,938 B2
(45) Date of Patent: May 18, 2021

(54) METHOD FOR TRANSMITTING AND RECEIVING WAKE-UP SIGNAL IN WIRELESS LAN SYSTEM AND APPARATUS THEREFOR

(71) Applicant: LG ELECTRONICS INC., Seoul (KR)

(72) Inventors: Dongguk Lim, Seoul (KR); Eunsung Park, Seoul (KR); Hangyu Cho, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 81 days.

(21) Appl. No.: 16/343,742

(22) PCT Filed: Sep. 15, 2017

(86) PCT No.: PCT/KR2017/010127
§ 371 (c)(1),
(2) Date: Apr. 19, 2019

(87) PCT Pub. No.: WO2018/074740
PCT Pub. Date: Apr. 26, 2018

(65) Prior Publication Data
US 2019/0289549 A1 Sep. 19, 2019

Related U.S. Application Data

(60) Provisional application No. 62/411,677, filed on Oct. 23, 2016, provisional application No. 62/413,433, (Continued)

(51) Int. Cl.
*H04W 52/02* (2009.01)
*H04W 84/12* (2009.01)
*H04W 56/00* (2009.01)

(52) U.S. Cl.
CPC ....... *H04W 52/0229* (2013.01); *H04W 52/02* (2013.01); *H04W 52/0219* (2013.01);
(Continued)

(58) Field of Classification Search
None
See application file for complete search history.

(56) References Cited

U.S. PATENT DOCUMENTS

| 4,101,834 A | * | 7/1978 | Stutt | H04B 3/542 |
| | | | | 307/105 |
| 2003/0220711 A1 | * | 11/2003 | Allen | G06K 19/0717 |
| | | | | 700/215 |

(Continued)

FOREIGN PATENT DOCUMENTS

| KR | 1020150044921 | 4/2015 |
| WO | 2013008989 | 1/2013 |

OTHER PUBLICATIONS

PCT International Application No. PCT/KR2017/010127, International Search Report dated Dec. 18, 2017, 3 pages.

(Continued)

*Primary Examiner* — Bunjob Jaroenchonwanit
(74) *Attorney, Agent, or Firm* — Lee Hong Degerman Kang Waimey

(57) ABSTRACT

A method for receiving a WUR signal by an STA, according to one embodiment of the present invention, comprises the steps of: detecting a WUR preamble sequence included in a WUR PPDU through a WUR receiver of the STA, while a WLAN receiver of the STA is turned off; obtaining WUR data included in the WUR PPDU, on the basis of a timing synchronized through the WUR preamble sequence; and outputting a wake-up signal to the WLAN receiver through the WUR receiver of the STA if the WUR data is intended for the STA, wherein the WUR preamble sequence used for the synchronization corresponds to a signature sequence (Continued)

carrying specific information, and the specific information may include at least one of an SU/MU indicator indicating whether the WUR PPDU is for a single user (SU) or a multi-user (MU), and information on the bandwidth of the WLAN PPDU to be received after wake-up by the WLAN receiver.

11 Claims, 23 Drawing Sheets

Related U.S. Application Data filed on Oct. 27, 2016, provisional application No. 62/429,866, filed on Dec. 5, 2016.

(52) U.S. Cl.
CPC ....... *H04W 52/0235* (2013.01); *H04W 56/00* (2013.01); *H04W 84/12* (2013.01); *Y02D 30/70* (2020.08)

(56) References Cited

U.S. PATENT DOCUMENTS

| | | | |
|---|---|---|---|
| 2011/0084815 A1 | 4/2011 | Fitzek | |
| 2015/0071204 A1* | 3/2015 | Seok | H04W 74/08 370/329 |
| 2015/0282132 A1* | 10/2015 | Kim | H04W 4/08 370/329 |
| 2016/0057703 A1* | 2/2016 | Benoit | H04W 52/0229 370/311 |
| 2016/0337964 A1* | 11/2016 | Mochizuki | H04W 48/08 |
| 2017/0111875 A1* | 4/2017 | Azizi | H04W 56/001 |
| 2017/0150428 A1* | 5/2017 | Nory | H04W 68/02 |
| 2017/0181090 A1* | 6/2017 | Park | H04L 27/26 |
| 2018/0007629 A1* | 1/2018 | Dorrance | H04L 27/06 |
| 2018/0146458 A1* | 5/2018 | Bharadwaj | H04W 72/042 |
| 2019/0036756 A1* | 1/2019 | Yi | H04L 67/12 |
| 2019/0159127 A1* | 5/2019 | Son | H04W 52/0229 |
| 2019/0191376 A1* | 6/2019 | Kim | H04W 52/0229 |
| 2019/0191457 A1* | 6/2019 | Si | H04W 48/12 |
| 2019/0230581 A1* | 7/2019 | Hwang | H04W 52/0225 |
| 2019/0253965 A1* | 8/2019 | Gan | H04W 48/08 |
| 2019/0281504 A1* | 9/2019 | Su | H04W 28/20 |
| 2019/0342843 A1* | 11/2019 | Raghavan | G06F 1/1698 |
| 2019/0349815 A1* | 11/2019 | Tiirola | H04W 28/26 |
| 2020/0037354 A1* | 1/2020 | Li | H04W 74/0808 |
| 2020/0053645 A1* | 2/2020 | Charbit | H04W 68/10 |
| 2020/0053649 A1* | 2/2020 | Yao | H04W 52/02 |
| 2020/0059345 A1* | 2/2020 | Pelletier | H04L 1/1657 |
| 2020/0137529 A1* | 4/2020 | Yu | H04L 27/2607 |
| 2020/0163018 A1* | 5/2020 | Wilhelmsson | H04W 52/0238 |
| 2020/0221384 A1* | 7/2020 | Ang | H04L 25/0226 |
| 2020/0274656 A1* | 8/2020 | Gordaychik | H04L 1/1835 |

OTHER PUBLICATIONS

Hsu, F et al., "LP WUR Wake-up Packet Identity Considerations", doc.: IEEE 802.11-16/0402r0, Mar. 2016, 9 pages.

Kim, I. et al., "Considerations on WUR Design", doc.: IEEE 802.11-16/0950r0, Jul. 2016, 12 pages.

* cited by examiner (a)

(b)

(a)

(b)

(a) Primary 20 MHz channel for WUR (b) Dedicated 20 MHz channel for WUR

METHOD FOR TRANSMITTING AND RECEIVING WAKE-UP SIGNAL IN WIRELESS LAN SYSTEM AND APPARATUS THEREFOR

CROSS-REFERENCE TO RELATED APPLICATIONS

This application is the National Stage filing under 35 U.S.C. 371 of International Application No. PCT/KR2017/ 010127, filed on Sep. 15, 2017, which claims the benefit of U.S. Provisional Application Nos. 62/411,677, filed on Oct. 23, 2016, 62/413,433, filed on Oct. 27, 2016, and 62/429, 866, filed on Dec. 5, 2016, the contents of which are all hereby incorporated by reference herein in their entirety.

BACKGROUND OF THE INVENTION

Field of the invention

The present invention relates to a method for transmitting and receiving a frame in a wireless LAN system and, more specifically, to a method for transmitting or receiving a low-power wake-up receiver (LP-WUR) signal compatible with an 802.11 wireless LAN system and a device therefor.

Related Art

A standard for the wireless LAN technology is being developed as an Institute of Electrical and Electronics Engineers (IEEE) 802.11 standard. IEEE 802.11a and b use an unlicensed band in 2.4. GHz or 5 GHz. And, IEEE 802.11b provides a transmission rate of 11 Mbps, and IEEE 802.11a provides a transmission rate of 54 Mbps. And, IEEE 802.11g provides a transmission rate of 54 Mbps by applying orthogonal frequency-division multiplexing (OFDM). IEEE 802.11n provides a transmission rate of 300 Mbps on 4 spatial streams by applying multiple input multiple output-OFDM (MIMO-OFDM). The IEEE 802.11n supports a channel bandwidth of up to 40 MHz, and, in this case, the IEEE 802.11n provides a transmission at of 600 Mbps.

The above-described wireless LAN (WLAN) standard was previously defined as the IEEE 802.11ac standard, which uses a maximum bandwidth of 160 MHz, supports 8 spatial streams, and supports a maximum rate of 1 Gbit/s. And, discussions are now being made on the IEEE 802.11ax standardization.

SUMMARY OF THE INVENTION

An object of the present invention is to provide a method for efficiently and accurately transmitting or receiving a low-power wake-up receiver (LP-WUR) signal compatible with an 802.11 wireless LAN system and a device therefor.

The present invention is not limited to the above-described technical task and other technical tasks can be inferred from embodiments of the present invention.

In accordance with one aspect of the present invention, there may be provided a method for receiving a wake-up receiver (WUR) signal by a station (STA) in a wireless local area network (WLAN) system, the method including: detecting a WUR preamble sequence comprised in a WUR physical layer protocol data unit (PPDU) through a WUR of the STA while a WLAN receiver of the STA is turned off; obtaining WUR data comprised in the WUR PPDU based on a time synchronized through the WUR preamble sequence; and outputting a wake-up signal to the WLAN receiver through the WUR of the STA when the WUR data is intended for the STA, wherein the WUR preamble sequence used for synchronization may correspond to a signature sequence carrying particular information, and the particular information may include at least one of a single user (SU)/multi-user (MU) indicator indicating whether the WUR PPDU is for an SU or for an MU and information about a bandwidth for a WLAN PPDU that the WLAN receiver receives after waking up.

In accordance with another aspect of the present invention, there may be provided a STA receiving a WUR signal in a WLAN system, the STA including: a WLAN receiver; and a WUR configured to detect a WUR preamble sequence comprised in a WUR PPDU while the WLAN receiver is turned off, to obtain WUR data comprised in the WUR PPDU based on a time synchronized through the WUR preamble sequence, and to output a wake-up signal to the WLAN receiver when the WUR data is intended for the STA, wherein the WUR preamble sequence used for synchronization may correspond to a signature sequence carrying particular information, and the particular information may include at least one of a SU/MU indicator indicating whether the WUR PPDU is for an SU or for an MU and information about a bandwidth for a WLAN PPDU that the WLAN receiver receives after waking up.

In accordance with still another aspect of the present invention, there may be provided a method for transmitting a WUR signal by an access point (AP) in a WLAN system, the method including: generating a WUR PPDU including a WUR preamble sequence and WUR data; transmitting the WUR PPDU to a WUR of a STA with a WLAN receiver turned off; and transmitting a WLAN PPDU to the STA after the WUR of the STA wakes up the WLAN receiver, wherein the WUR preamble sequence used for synchronization between the WUR receiver of the STA and the AP may correspond to a signature sequence carrying particular information, and the particular information may include at least one of a SU/MU indicator indicating whether the WUR PPDU is for an SU or for an MU and information about a bandwidth for a WLAN PPDU that the WLAN receiver transmits after waking up.

In accordance with yet another aspect of the present invention, there may be provided an access point (AP) device to perform the foregoing method for transmitting a WUR signal.

The WUR preamble sequence may be received through a narrow band narrower than the bandwidth for the WLAN PPDU, and the narrow band may be a portion of subcarriers comprised in a WLAN primary 20 MHz channel or a WUR-dedicated 20 MHz channel Power for the WUR preamble may e boosted according to an equation of SQRT(M/N), where SQRT may denote a square root, M may denote the total number of subcarriers comprised in the 20 MHz channel, and N may denote the total number of subcarriers comprised in the narrow band.

The WUR preamble sequence may be repeated a plurality of times in the WUR PPDU. For example, the WUR preamble sequence may be a spread sequence with a length of N for on-off keying modulation mapping of one bit of the WUR data to N subcarriers, and the WUR preamble sequence (e.g., the spread sequence with the length of N) may be repeated a plurality of times in a time domain. Alternatively, the WUR preamble sequence may be loaded at a two-subcarrier or four-subcarrier interval in N subcarriers mapped to the WUR data and may be repeated two or four times in a time domain.

The particular information may further include at least one of an ID of the STA, a broadcast ID, and a basic service set (BSS) ID.

According to one embodiment of the present invention, particular information for transmitting and receiving a WUR signal and/or a WLAN signal may be early indicated through a WUR preamble sequence used for synchronization between a WUR receiver of a STA and an AP, thereby efficiently and accurately transmitting and receiving the WUR signal and/or the WLAN signal.

The present invention is not limited to the foregoing technical effect, and other technical effects may be derived from embodiments of the present invention.

DESCRIPTION OF EXEMPLARY EMBODIMENTS

Hereinafter, the preferred embodiment of the present invention will be described in detail with reference to the appended drawings. The detailed description that will hereinafter be disclosed along with the appended drawings will only be provided to describe an exemplary embodiment of the present invention. And, therefore, it should be understood that the exemplary embodiment presented herein will not represent the only embodiment for carrying out the present invention.

The following detailed description includes specific details for providing a full understanding of the present invention. However, it will be apparent to anyone skilled in the art that the present invention can be carried out without referring to the above-mentioned specific details. In some cases, in order to avoid any ambiguity in the concept of the present invention, the disclosed structure and device may be omitted, or the disclosed structure and device may be illustrated as a block diagram based on their core functions.

As described above, the following description relates to a method and apparatus for efficiently utilizing a channel having a wide bandwidth in a wireless LAN system. To this end, a wireless LAN system to which the present invention is applied will be described in detail.

Figure 1:
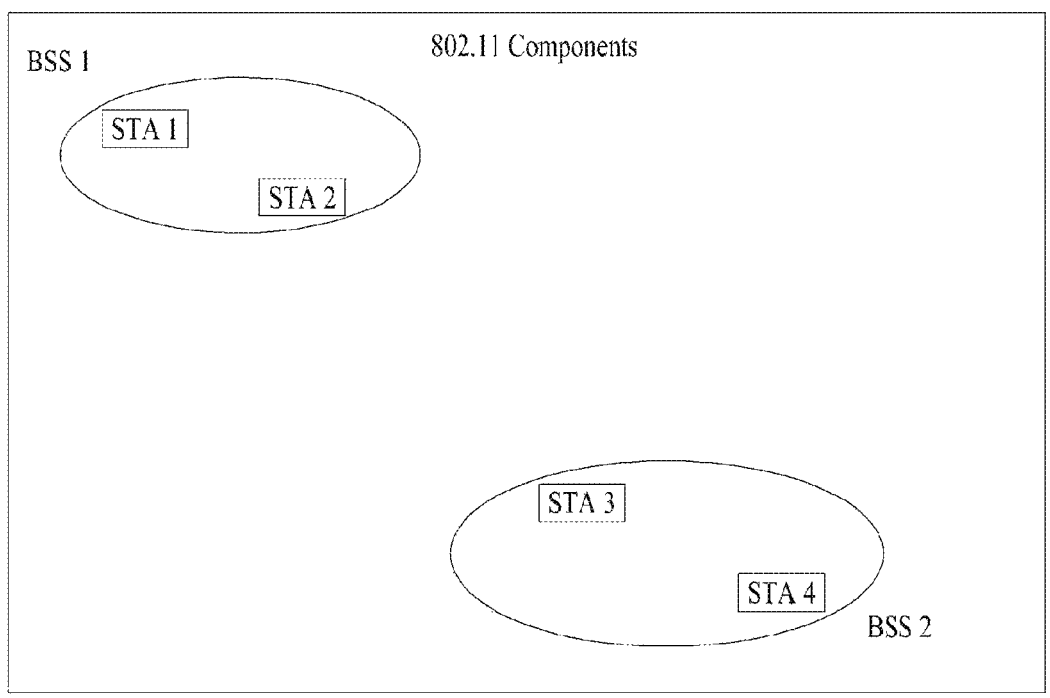
FIG. 1 is a diagram showing an exemplary configuration of a wireless LAN (WLAN) system.

FIG. 1 is a diagram showing an exemplary configuration of a wireless LAN (WLAN) system.

As shown in FIG. 1, a wireless LAN (WLAN) includes one or more Basic Service Set (BSS). A BSS is a set (or group) of stations (STAs) that successfully achieve synchronization so as to communication with one another.

As a logical entity including a Medium Access Control (MAC) and a Physical Layer interface for a wireless medium, an STA includes an access point (AP) and a non-AP Station. Among the STAs, a portable device (or terminal) that is operated by a user corresponds to a non-AP Station. And, therefore, when an entity is simply mentioned to as an STA, the STA may also refer to a non-AP Station. Herein, the non-AP Station may also be referred to as other terms, such as a terminal, a wireless transmit/receive unit (WTRU), a user equipment (UE), a mobile station (MS), a mobile terminal, a mobile subscriber unit, and so on.

Additionally, the AP is an entity providing its associated station (STA) with an access to a distribution system (DS) through a wireless medium. Herein, the AP may also be referred to as a centralized controller, a base station (B), a Node-B, a base transceiver system (BTS), a personal basic service set central point/access point (PCP/AP), a site controller, and so on.

A BSS may be categorized as an infrastructure BSS and an independent BSS (IBSS).

The BSS shown in FIG. 1 corresponds to an IBSS. The IBSS refers to a BSS that does not include an AP. And, since the BSS does not include an AP, access to the DS is not authorized (or approved), and, therefore, the IBSS functions as a self-contained network.

Figure 2:
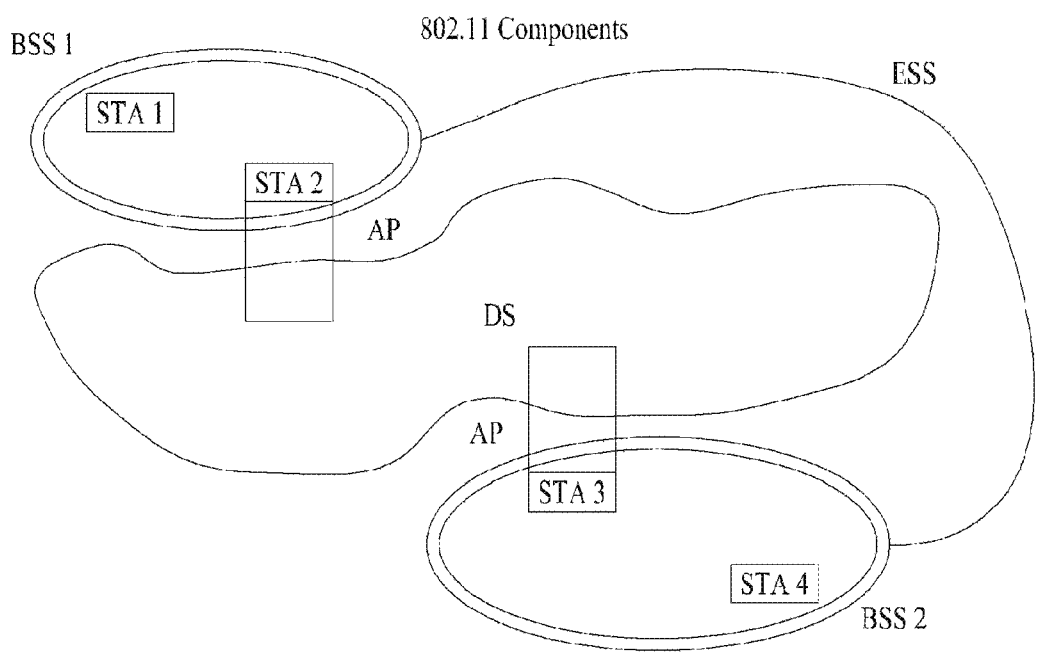
FIG. 2 is a diagram showing another exemplary configuration of a wireless LAN (WLAN) system.

FIG. 2 is a diagram showing another exemplary configuration of a wireless LAN (WLAN) system.

The BSS shown in FIG. 2 corresponds to an infrastructure BSS. The infrastructure BSS includes one or more STAs and APs. As a rule, although the communication between non-AP STAs is established by passing through the AP, in case a direct link is configured between the non-AP STAs, direct communication may also be established between the non-AP STAs.

As shown in FIG. 2, a plurality of infrastructure BSSs may be interconnected to one another through the DS. The plurality of BSSs being interconnected to one another through the DS is collectively referred to as an extended service set (ESS). The STAs being included in the ESS may perform communication between one another, and, a non- AP STA may shift (or relocate) from one BSS to another BSS within the same ESS while performing uninterrupted communication.

As a mechanism that connects the plurality of APs, the DS is not necessarily required to correspond to a network. As long as the DS is capable of providing a predetermined distribution service, there is no limitation in the structure or configuration of the DS. For example, the DS may correspond to a wireless network, such as a mesh network, or the DS may correspond to a physical structure (or entity) that connects the APs to one another.

Layer Structure

The operation of an STA operating in a wireless LAN system can be described from the viewpoint of a layer structure. A layer structure can be realized by a processor in terms of device configuration. An STA may have a structure of multiple layers. For example, a layer structure mainly handled in 802.11 standard document is a MAC sublayer and a physical layer (PHY) on a data link layer (DLL). The PHY may include a physical layer convergence procedure (PLCP) entity, a physical medium dependent (PMD) entity, and the like. The MACK sublayer and PHY conceptually includes management entities called a MAC sublayer management entity (MLME) and a physical layer management entity (PLME), respectively. These entities provide a layer management service interface in which a layer management function operates.

To provide a correct MAC operation, a station management entity (SME) is present in each STA. The SME is a layer-independent entity which may be regarded as being present in a separate management plane or off to the side. Although correct functions of the SME are not described in detail in this document, the SME may be considered to serve to collect layer-dependent states from various layer management entities (LMEs) and set similar layer-specific parameter values in general. The SME can execute such functions on behalf of a general system management entity and realize a standard management protocol.

The aforementioned entities interact with each other in various manners. For example, entities can interact with each other by exchanging GET/SET primitives. A primitive refers to a set of elements or parameters related to a specific purpose. XX-GET.request primitive is used to request a value of given MIB attribute (management information based attribute information). XX-GET.confirm primitive is used to return an appropriate MIB attribute information value if the status is "successful" and return an error indication in a status field if not. XX-SET.request primitive is used to request an indicated MIB attribute to be set as a given value. When the MIB attribute means a specific operation, this requests the operation to be performed. In addition, XX-SET.confirm primitive is used to confirm that an indicated MIB attribute has been set to a requested value if the status is "successful" and return an error condition to the status field if not. When the MIB attribute means a specific operation, this confirms that the operation has been performed.

Further, the MLME and the SME can exchange various MLME_GET/SET primitives through an MLME_SAP (Service Access Point). In addition, various PLME_GET/SET primitives can be exchange between the PLME and the SME through PLME_SAP and exchanged between the MLME and the PLME through MLME-PLME_SAP.

Link Setup Procedure

Figure 3:
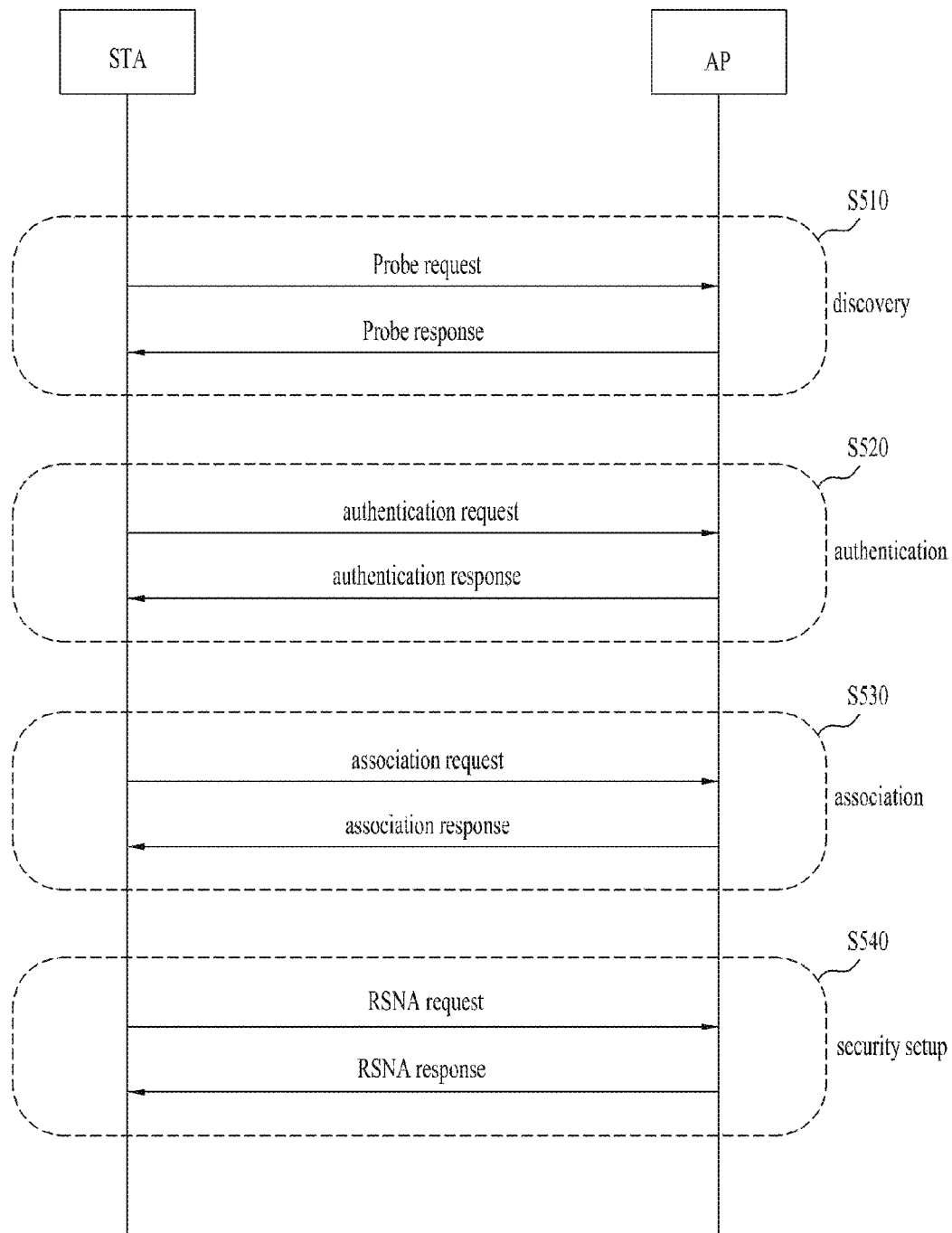
FIG. 3 is a diagram for describing a general link setup procedure.

FIG. 3 is a diagram for describing a general link setup procedure.

To set up a link with respect to a network and transmit/receive data, an STA needs to discover the network, perform authentication, establish association and perform an authentication procedure for security. The link setup procedure may also be referred to as a session initiation procedure and a session setup procedure. Further, the discovery, authentication, association and security setup process of the link setup procedure may be referred to as an association process.

An exemplary link setup procedure will be described with reference to FIG. 3.

In step S510, the STA may perform a network discovery operation. The network discovery operation may include a scanning operation of the STA. That is, the STA needs to discover a network in which the STA can participate in order to access the network. The STA needs to identify a compatible network before participating in a wireless network. A process of identifying a network present in a specific area is called scanning.

Scanning includes active scanning and passive scanning

FIG. 3 illustrates a network discovery operation including active scanning An STA that performs active scanning transmits a probe request frame in order to search neighboring APs while moving to channels and waits for a response to the probe request frame. A responder transmits a probe response frame as a response to the probe request frame to the STA that has transmitted the probe request frame. Here, the responder may be an STA that has transmitted a last beacon frame in a BSS of a channel that is being scanned. An AP is a responder in a BSS because the AP transmits a beacon frame, whereas a responder is not fixed in an IBSS because STAs transmit a beacon frame in turn. For example, an STA that has transmitted a probe request frame in channel #1 and received a probe response frame in channel #1 can store BSS related information included in the received probe response frame, move to the next channel (e.g., channel #2) and perform scanning (i.e., probe request/response transmission/reception) through the same method.

Although not shown in FIG. 3, passive scanning may be performed as a scanning method. In passive scanning, an STA that performs scanning waits for a beacon frame while moving to channels. The beacon frame is one of management frames in IEEE 802.11 which indicates presence of a wireless network and is periodically transmitted such that an STA performing scanning can discover a wireless network and participate therein. An AP serves to periodically transmit the beacon frame in a BSS and STAs transmit the beacon frame in turn in an IBSS. An STA performing scanning stores information about a BSS included in a beacon frame upon reception of the beacon frame and records beacon frame information in each channel while moving to other channels. An STA that has received a beacon frame can store BSS related information included in the received beacon frame, move to the next channel and perform scanning in the next channel in the same manner.

Comparing active scanning with passive scanning, active scanning has less delay and power consumption than passive scanning After the STA discovers a network, an authentication process can be performed in step S520. This authentication process may be referred to as a first authentication process to be clearly discriminated from a security setup process in step S540 which will be described later.

The authentication process includes a process through which the STA transmits an authentication request frame to an AP and a process through which the AP transmits an authentication response frame in response to the authentication request frame to the STA. Authentication frames used for authentication request/response correspond to management frames.

An authentication frame may include information about an authentication algorithm number, an authentication transaction sequence number, status code, a challenge text, a robust security network (RSN), a finite cyclic group, and the like. This corresponds to some examples of information that can be included in authentication request/response frames and may be replaced by other information or may include additional information.

The STA may transmit the authentication request frame to the AP. The AP may determine whether to permit authentication of the STA based on information included in the received authentication request frame. The AP may provide an authentication processing result to the STA through an authentication response frame.

After successful authentication of the STA, an association process can be performed in step S530. The association process includes a process through which the STA transmits an association request frame to the AP and a process through which the AP transmits an association response frame to the STA.

For example, the authentication request frame may include information such as information about various capabilities, a beacon listen interval, a service set identifier (SSI), supported rates, supported channels, an RSN, a mobility domain, supported operating classes, traffic indication map (TIM) broadcast request, an interworking service capability, and the like.

For example, the association response frame may include information such as information about various capabilities, status code, an association ID (AID), supported rates, an enhanced distributed channel access (EDCA) parameter set, a received channel power indicator (RCPI), a received signal to noise indicator (RSNI), a mobility domain, a timeout interval (association comeback time), an overlapping BSS scan parameter, a TIM broadcast response, a QoS map, and the like.

The aforementioned information corresponds to some examples of information that can be included in the association request/response frames and may be replaced by other information or may include additional information.

After successful association of the STA with the network, the security setup process can be performed in step S540. The security setup process in step S540 may also be called an authentication process through robust security network association (RSNA) request/response, and the authentication process of step S520 may be referred to as the first authentication process and the security setup process of step S540 may be simply referred to as an authentication process.

The security setup process of step S540 may include a private key setup process through 4-way handshaking using an extensible authentication protocol over LAN (EAPOL) frame. Further, the security setup process may be performed according to a security scheme that is not defined in IEEE 802.11 standards.

Medium Access Mechanism

In IEEE 802.11 wireless LAN systems, a basic access mechanism of medium access control (MAC) is a Carrier Sense Multiple Access with Collision Avoidance (CSMA/CA) mechanism. The CSMA/CA mechanism is also called a distributed coordination function (DCF) of IEEE 802.11 MAC and basically employs a "listen before talk" access mechanism. According to this type of access mechanism, an AP and/or an STA can perform clear channel assessment of sensing a radio channel or a medium for a predetermined duration (e.g., a DCF inter-frame space (DIFS) prior to start of transmission. If a medium is determined to be in an idle status as a sensing result, frame transmission is started through the medium. On the other hand, it is detected that the medium is in an occupied status, the AP and/or the STA may set a delay period (e.g., a random backoff period) for medium access, wait for the delay period and then attempt frame transmission instead of starting transmission thereof. Application of the random backoff period can minimize collision because a plurality of STAs is expected to attempt frame transmission after waiting for difference periods of time.

Further, IEEE 802.11 MAC protocol provides a hybrid coordination function (HCF). The HCF is based on the DCF and a point coordination function (PCF). The PCF is a polling based synchronous access method and refers to periodic polling for allowing all reception APs and/or STAs to receive data frames. In addition, the HCF has enhanced distributed channel access (EDCA) and HCF controlled channel access (HCCA). EDCA uses a contention-based access method for a provider to provide data frames to a plurality of users and HCCA uses a contention-free-based channel access method using a polling mechanism. Further, the HCF includes a medium access mechanism for improving quality of service (QoS) of a WLAN and can transmit QoS data in both a contention period (CP) and a content-free period (CFP).

Figure 4:
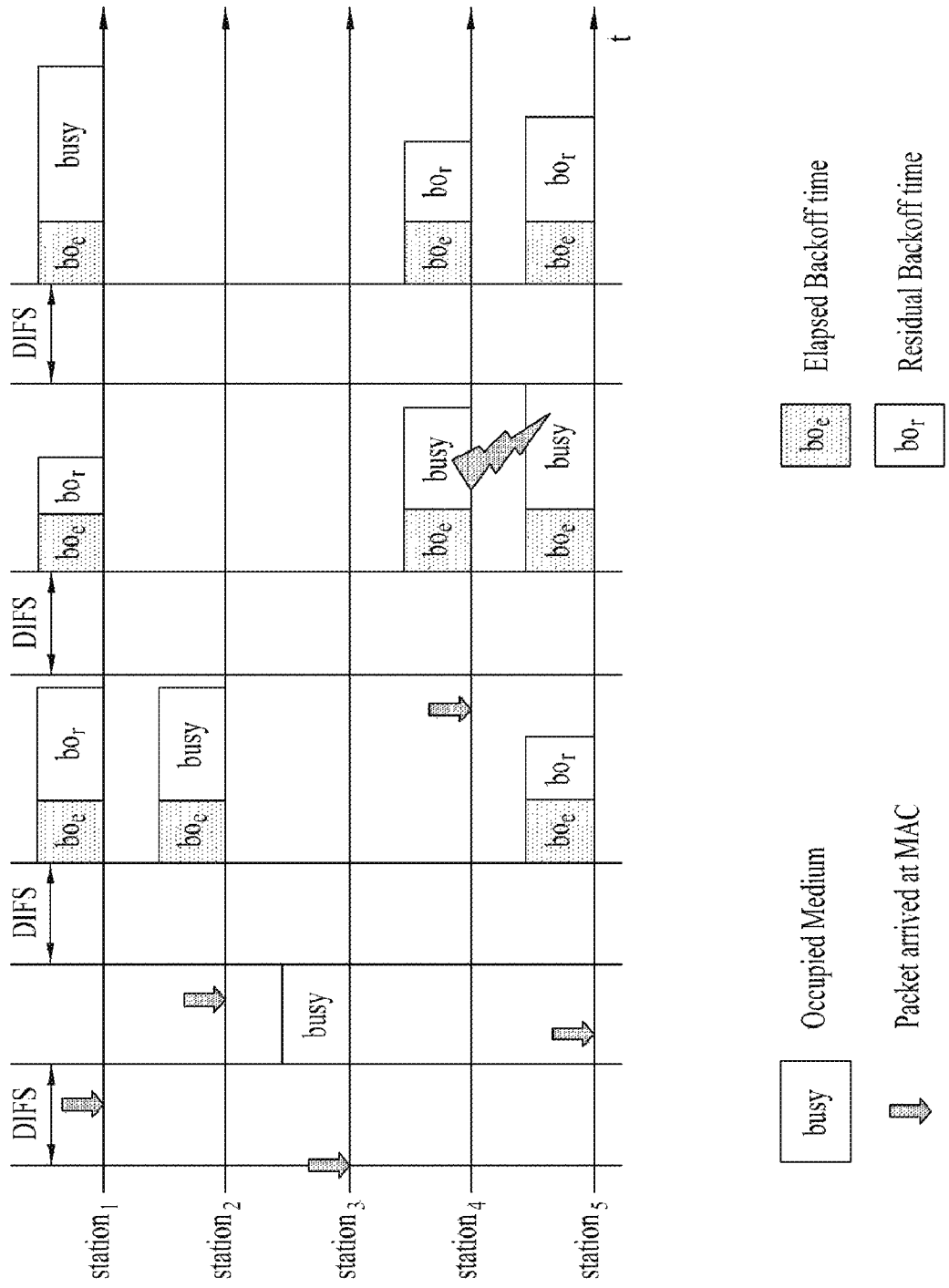
FIG. 4 is a diagram for describing a backoff procedure.

FIG. 4 is a diagram for describing a backoff procedure.

An operation based on a random backoff period will be described with reference to FIG. 4. When a medium in an occupied (or busy) status switches to an idle status, STAs can attempt data (or frame) transmission. Here, each STA can select a random backoff count, wait for a slot duration corresponding to the random backoff count and then attempt transmission in order to minimize collision. A random backoff count has a packet number value and can be determined as one of values in the range of 0 to CW. Here, CW is a contention window parameter value. Although CWmin is provided as an initial value of the CW parameter, the CW parameter can have a double value in the case of transmission failure (for example, when ACK for a transmitted frame cannot be received). When the CW parameter value reaches CWmax, it is possible to attempt data transmission while maintaining the value of CWmax until data transmission is successfully performed. The CW parameter value is reset to CWmin when data transmission has been successfully performed. It is desirable that CW, CWmin and CWmax be set to $2^n-1$ (n=0, 1, 2, ... ).

When a random backoff procedure starts, an STA continuously monitors a medium while counting down backoff slots according to a determined backoff count value. The STA stops countdown and waits when the STA monitors that the medium in an occupied status and resumes countdown when the medium switches to an idle status.

Figure 6:
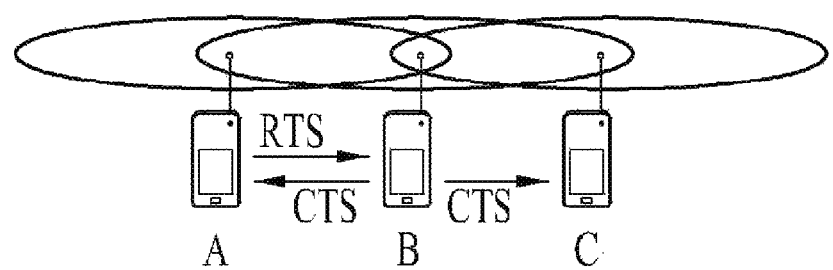
FIG. 6 is a diagram for describing RTS and CTS.
Figure 6:
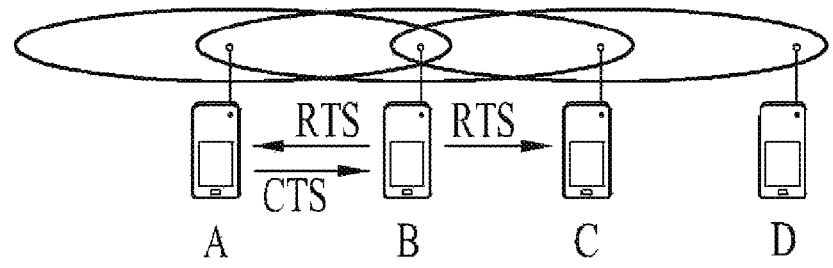

When a packet to be transmitted arrives at the MAC of STA3 in the example of FIG. 4, STA3 can confirm that a medium is in an idle status for DIFS and immediately transmit a frame. Other STAs monitor that the medium is in a busy status and wait. During this period, data to be transmitted may be generated in STA1, STA2 and STA5, and each STA can wait for DIFS and then count down backoff slots according to a random backoff count value selected thereby when it is monitored that the medium is in an idle status. The example of FIG. 4 shows a case in which STA2 selects a smallest backoff count value and STA1 selects a largest backoff count value. That is, the example illustrates a case in which a remaining backoff time of STA5 at the point in time at when STA2 ends backoff count and starts frame transmission is shorter than a remaining backoff time of STA1. STA1 and STA5 temporarily stops countdown and wait while STA2 occupies the medium. When occupation of STA2 ends and the medium switches to an idle status again, STA1 and STA5 wait for DIFS and then resume stopped backoff count. That is, STA1 and STA5 can count down the remaining backoff slots for the remaining backoff time and then start frame transmission. Since the remaining backoff time of STA5 is shorter than that of STA1, STA5 starts frame transmission. Meanwhile, data to be transmitted may be generated in STA4 while STA2 occupies the medium. Here, STA4 can wait for DIFS, perform countdown according to a random backoff count value selected thereby and start frame transmission when the medium switches to an idle state. The example of FIG. 6 shows a case in which the remaining backoff time of STA5 is coincidentally consistent with the random backoff count value of STA4. In this case, a collision may occur between STA4 and STA5. When a collision occurs, both STA4 and STA4 cannot receive ACK and fail in data transmission. In this case, STA4 and STA5 can double a CW value, select a random backoff count value and perform countdown. Meanwhile, STA1 can wait while the medium is in an occupied status due to transmission of STA4 and STA5, wait for DIFS when the medium switches to an idle status and then start frame transmission when the remaining backoff time has elapsed.

Sensing Operation of STA

As described above, the CSMA/CA mechanism includes virtual carrier sensing in addition to physical carrier sensing by which an AP and/or an STA directly sense a medium. Virtual carrier sensing is to solve a problem that may be generated in medium access, such as a hidden node program. For virtual carrier sensing, MAC of a wireless LAN system can use a network allocation vector (NAV). The NAV is a value by which an AP and/or an STA that are currently using a medium or have the authority to use the medium indicate a remaining time until the medium is available to other APs and/or STAs. Accordingly, a value set to a NAV corresponds to a period in which a medium is scheduled to be used by an AP and/or an STA that transmit corresponding frames, and an STA that receives the NAV value is prohibited from accessing the medium during the period. A NAV can be set according to a value of "duration" field of a MAC header of a frame, for example.

Furthermore, a robust collision detection mechanism has been introduced in order to reduce possibility of collision. This will be described with reference to FIGS. 5 and 7. Although an actual carrier sensing range may not be consistent with a transmission range, it is assumed that they are consistent with each other for convenience of description.

Figure 5:
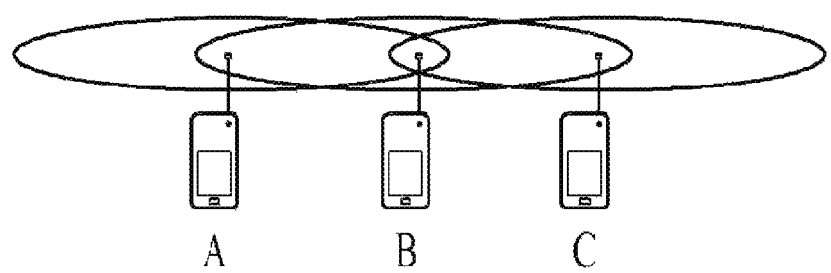
FIG. 5 is a diagram for describing a hidden node and an exposed node.
Figure 5:
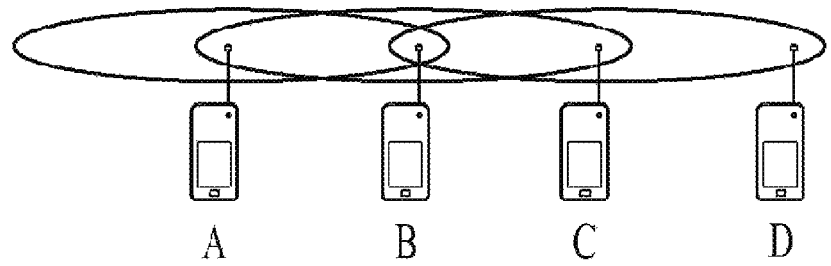

FIG. 5 is a diagram for describing a hidden node and an exposed node.

FIG. 5(a) illustrates a hidden node and shows a case in which STA A and STA B are communicating with each other and STA C has information to be transmitted. Specifically, while STA A is transmitting information to STA B, a medium may be determined to be in an idle status when STA C performs carrier sensing before sending data to STA B. This is because transmission (i.e., medium occupation) of STA A may not be sensed at the position of STA C. In such a case, STA B simultaneously receives information of STA A and STA C and thus a collision occurs. Here, STA A may be regarded as a hidden node of STA C.

FIG. 5(b) illustrates an exposed node and shows a case in which STA C has information to be transmitted to STA D while STA B is transmitting data to STA A. In this case, when STA C performs carrier sensing, a medium can be determined to be in an occupied status due to transmission of STA B. Accordingly, even if STA C has information to be transmitted to STA D, STA C needs to wait until the medium switches to an idle status because the occupied status of the medium is sensed. However, transmission from STA C and transmission from STA B may not collide from the viewpoint of STA A because STA A is out of the transmission range of STA C. Accordingly, STA C unnecessarily waits until STA B stops transmission. Here, STA C may be regarded as an exposed node of STA B.

FIG. 6 is a diagram for describing RTS and CTS.

To efficiently use a collision avoidance mechanism in an exemplary situation such as the example of FIG. 5, a short signaling packet such as RTS (request to send) and CTS (clear to send) can be used. RTS/CTS between two STAs can be caused to be overheard by neighbor STAs such that the neighbor STAs can consider whether information is transmitted between the two STAs. For example, when an STA that attempts to transmit data transmits an RTS frame to an STA that receives the data, the STA that receives the data can indicate that it will receive the data by transmitting a CTS frame to neighbor STAs.

FIG. 6(a) illustrates a method for solving a hidden node problem and assumes a case in which both STA A and STA C attempt to transmit data to STA B. When STA A sends RTS to STA B, STA B transmits CTS to both STA A and STA C around STA B. Consequently, STA C can avoid collision because it waits until data transmission of STA A and STA B ends.

FIG. 6(b) illustrates a method for solving an exposed node problem and shows a case in which STA C can determine that a collision does not occur even when STA C transmits data to other STAs (e.g., STA D) by overhearing RTS/CTS transmission between STA A and STA B. That is, STA B transmits RTS to all neighbor STAs and transmits CTS to STA A to which STA B will actually transmit data. Since STA C has received only RTS and has not received CTS of STA A, STA C can recognize that STA A is out of carrier sensing of STA C.

Power Management

As described above, an STA needs to perform channel sensing before performing transmission and reception in a wireless LAN system. Sensing a channel all the time causes continuous power consumption of the STA. Power consumption in a reception state does not considerably differ from power consumption in a transmission state, and continuous maintaining of a reception state is a considerable burden on an STA having limited power (i.e., operating by a battery). Accordingly, when an STA maintains a reception standby state in order to continuously sense channels, the STA inefficiently consumes power with no particular advantage with respect to wireless LAN throughput. To solve such a problem, wireless LAN systems support an STA power management (PM) mode.

The STA power management mode is divided into an active mode and a power save (PS) mode. An STA operates in the active mode by default. The STA operating in the active mode maintains an awake state. The awake state is a state in which a normal operation such as frame transmission and reception or channel scanning can be performed. On the other hand, an STA operating in the PS mode operates while switching to a sleep state (or doze state) and the awake state. An STA operating in the sleep state operates with minimum power and does not perform channel scanning as well as frame transmission and reception.

Since power consumption of an STA decreases as the STA operates in the sleep state as long as possible, the operation period of the STA increases. However, the STA cannot operate for a long time unconditionally because frame transmission and reception cannot be performed in the sleep state. When an STA operating in the sleep state has a frame to be transmitted to an AP, the STA switches to the awake state and can transmit the frame. Meanwhile, when an AP has a frame to be transmitted to STAs, an STA in the sleep state cannot receive the frame and cannot recognize presence of the frame to be transmitted. Accordingly, the STA may need to perform an operation of switching to the awake state at a specific interval in order to recognize presence or absence of a frame to be transmitted thereto (and in order to receive the frame if it is present).

An AP can transmit a beacon frame to STAs in a BSS at predetermined intervals. The beacon frame may include a traffic indication map (TIM) information element. The TIM information element may include information indicating that buffered traffic for STAs associating with the AP is present and the AP will transmit a frame. A TIM element includes a TIM used to indicate a unicast frame and a delivery traffic indication map (DTIM) used to indicate a multicast or broadcast frame.

Figure 7:
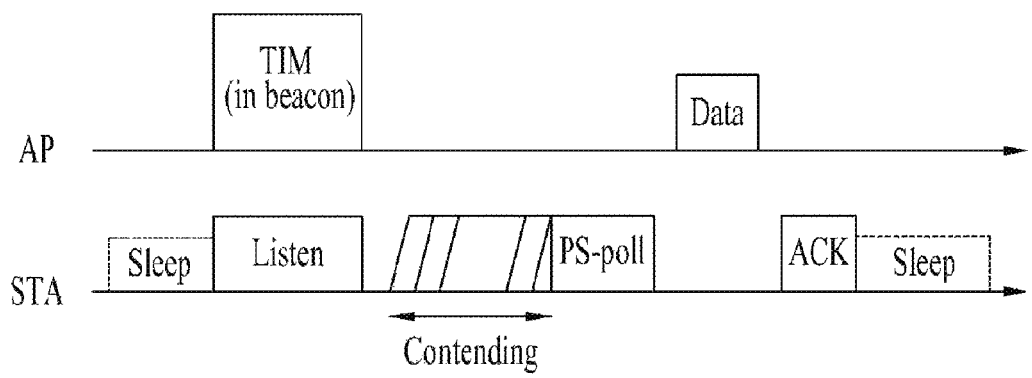
FIGS. 7 to 9 are diagrams for describing an operation of an STA which has received a TIM.
Figure 8:
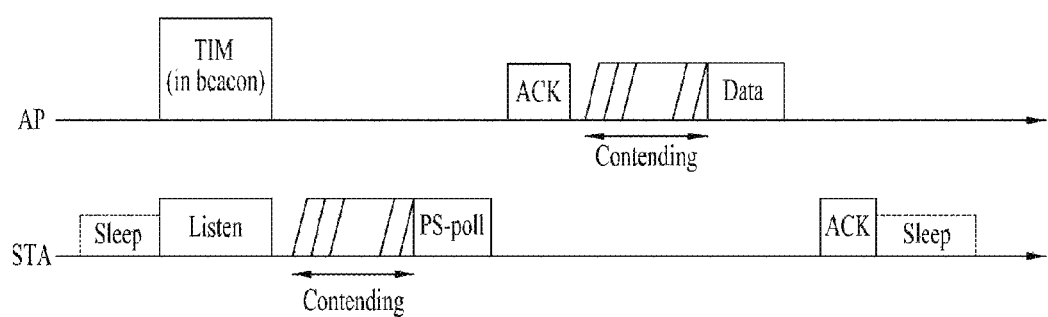
Figure 9:
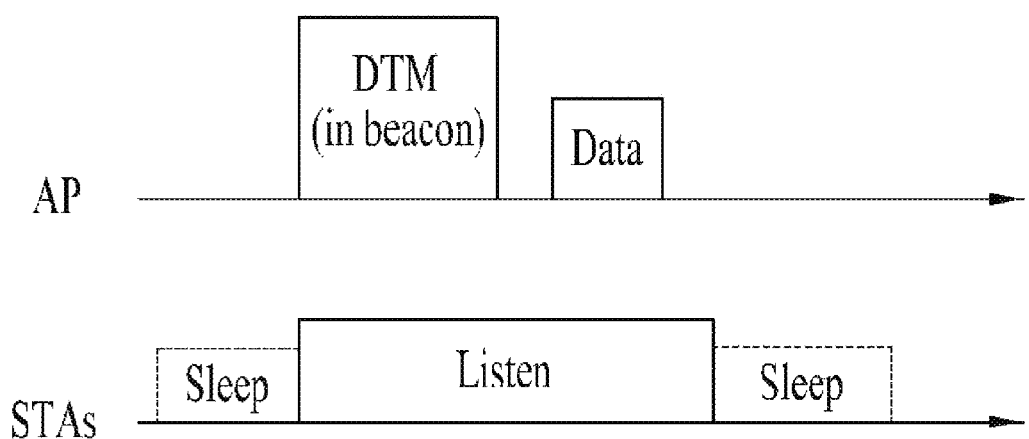

FIGS. 7 to 9 are diagrams for describing an operation of an STA that has received a TIM.

Referring to FIG. 7, an STA switches from a sleep state to an awake state in order to receive a beacon frame including a TIM from an AP and can be aware of presence of buffered traffic to be transmitted thereto by analyzing the received TIM element. The STA can perform contending with other STAs for medium access for PS-Poll frame transmission and then transmit a PS-Poll frame to request data frame transmission from the AP. Upon reception of the PS-Poll frame transmitted from the STA, the AP can transmit a frame to the STA. The STA can receive the data frame and transmit an ACK frame for the data frame to the AP. Thereafter, the STA can switch to a sleep state again.

As shown in FIG. 7, the AP can operate according to an immediate response method in which the AP receives the PS-Poll frame from the STA and then transmits a data frame after a predetermined time (e.g., short inter-frame space (SIFS)). On the other hand, when the AP has not prepared a data frame to be transmitted to the STA for SIFS after reception of the PS-Poll frame, the AP can operate according to a deferred response method. This will be described with reference to FIG. 8.

In the example of FIG. 8, an operation of the STA to switch from a sleep state to an awake state to receive a TIM from the AP and transmit a PS-Poll frame to the AP through contention is the same as that in the example of FIG. 7. When the AP has not prepared a data frame for SIFS although it has received the PS-Poll frame, the AP can transmit an ACK frame instead of the data frame to the STA. The AP can transmit the data frame to the STA after performing contending when the data frame is prepared after ACK frame transmission. The STA can transmit an ACK frame indicating that the data frame has been successfully received to the AP and switch to a sleep state.

FIG. 9 illustrates transmission of a DTIM by an AP. STAs can switch from a sleep state to an awake state in order to receive a beacon frame including a DTIM element from the AP. The STAs can recognize that a multicast/broadcast frame will be transmitted through the received DTIM. The AP can immediately transmit data (i.e., multicast/broadcast frame) after transmission of the beacon frame including the DTIM without an operation of transmitting/receiving a PS-Poll frame. The STAs can receive the data while continuously maintaining the awake state after reception of the beacon frame including the DTIM and switch to a sleep state again after completion of data reception.

General Frame Structure

Figure 10:
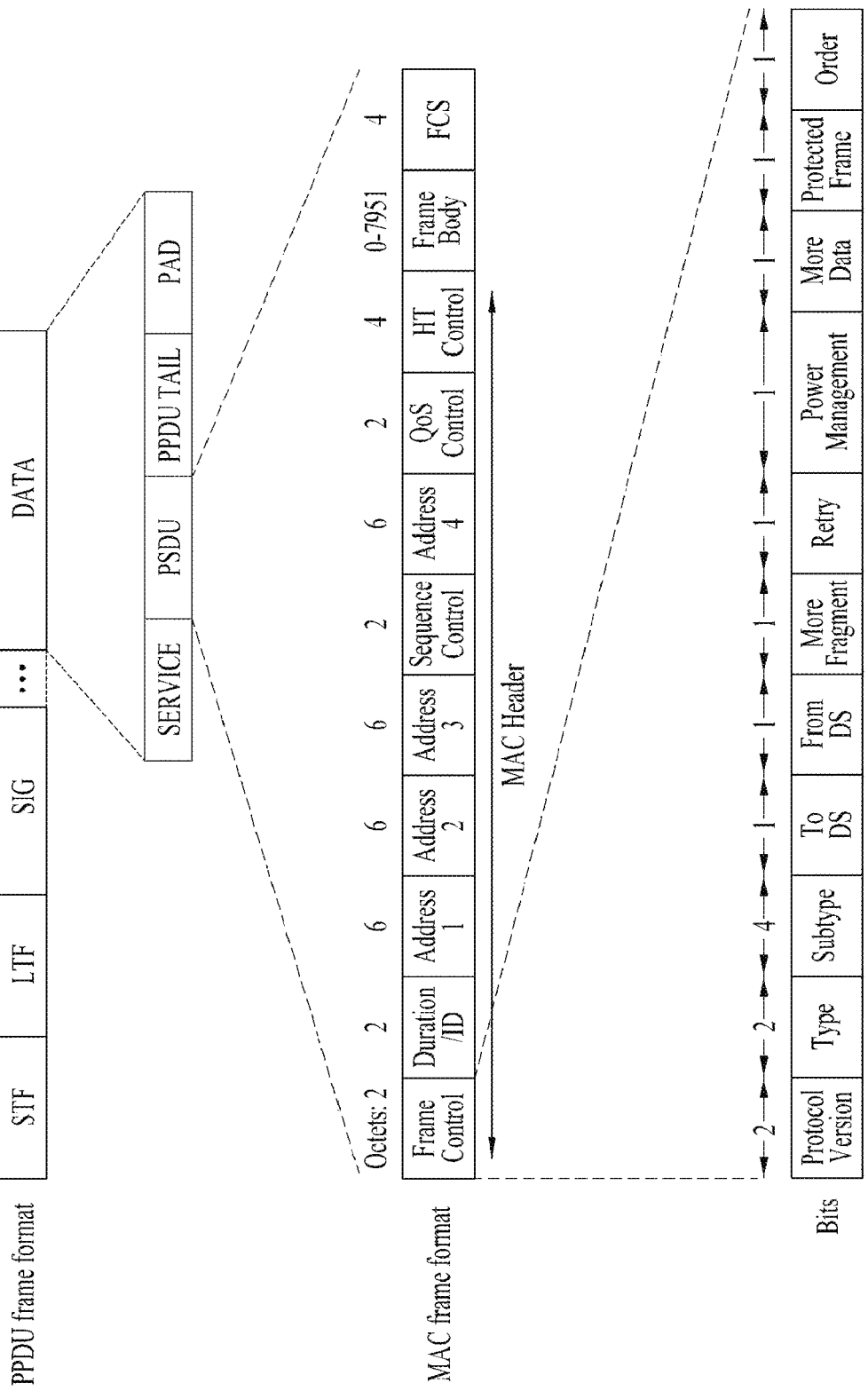
FIG. 10 is a diagram for describing an example of a frame structure used in an IEEE 802.11 system.

FIG. 10 is a diagram for describing an example of a frame structure used in IEEE 802.11.

A PPDU (Physical Layer Protocol Data Unit) frame format may include an STF (Short Training Field), an LTF (Long Training Field), a SIG (SIGNAL) field and a data field. The most basic (e.g., non-HT (High Throughput)) PPDU frame format may include only L-STF (Legacy-STF), L-LTF (Legacy-LTF), SIG and data fields.

STF is a signal for signal detection, AGC (Automatic Gain Control), diversity selection, accurate time synchronization, and the like and LTF is a signal for channel estimation, frequency error estimation, and the like. STF and LTF may be collectively called a PLCP preamble and the PLCP preamble may be regarded as a signal for OFDM physical layer synchronization and channel estimation.

The SIG field may include a RATE field and a LENGTH field. The RATE field may include information about data modulation and a coding rate. The LENGTH field may include information about a data length. Additionally, the SIG field may include a parity bit, a SIG TAIL bit, and the like.

The data field may include a SERVICE field, a PSDU (Physical layer Service Data Unit), a PPDU TAIL bit and also include a padding bit as necessary. Some bits of the SERVICE field can be used for synchronization of a descrambler at a receiving end. The PSDU corresponds to an MPDU (MAC Protocol Data Unit) defined in the MAC layer and may include data generated/used in a higher layer. The PPDU TAIL bit can be used to return an encoder to state 0. The padding bit can be used to set the length of the data field in a predetermined unit.

The MPDU is defined according to various MAC frame formats and a basic MAC frame includes a MAC header, a frame body and an FCS (Frame Check Sequence). The MAC frame is composed of the MPDU and may be transmitted/received through a PSDU of a data part of a PPDU frame format.

The MAC header includes a frame control field, a duration/ID field, an address field, and the like. The frame control field may include control information necessary for frame transmission/reception. The duration/ID field may be set to a time for transmitting a corresponding frame.

The duration/ID field included in the MAC header may be set to a 16-bit length (e.g., B0 to B15). Content included in the duration/ID field may vary according to frame type and sub-type, whether transmission is performed for a contention free period (CFP), and QoS capability of a transmission STA. (i) In a control frame having a sub-type of PS-Poll, the duration/ID field may include an AID of a transmission STA (e.g., through 14 LSBs) and 2 MSBs may be set to 1. (ii) In frames transmitted by a point coordinator (PC) or a non-QoS STA for a CFP, the duration/ID field may be set to a fixed value (e.g., 32768). (iii) In other frames transmitted by non-QoS STAs or control frames transmitted by QoS STAs, the duration/ID field may include a duration value defined per frame type. In a data frame or a management frame transmitted by a QoS STA, the duration/ID field may include a duration value defined per frame type. For example, when the duration/ID field is set to B15=0, it indicates that the duration/ID field is used to indicate a TXOP duration, and B0 to B14 may be used to indicate an actual TXOP duration. The actual TXOP duration indicated by B0 to B14 may be one of 0 to 32767 and the unit thereof may be us. However, when the duration/ID field indicates a fixed TXOP duration value (e.g., 32768), B15=1 and B0 to B14=0 can be set. Further, when B14=1 and B15=1 are set, the duration/ID field is used to indicate an AID and B0 to B13 indicate one of 1 to 2007 AIDs. Refer to IEEE 802.11 standard documents for details of sequence control, QoS control, HT control subfields of the MAC header.

The frame control field of the MAC header may include Protocol Version, Type, Subtype, To DS, From DS, More Fragment, Retry, Power Management, More Data, Protected Frame and Order subfields. Refer to IEEE 802.11 standard documents for details of each subfield of the frame control field.

Low-Power Wake-Up Receiver (LP-WUR)

An overview of an LP-WUR that can be used in a wireless LAN system (e.g., 802.11) will be described with reference to FIG. 11.

Figure 11:
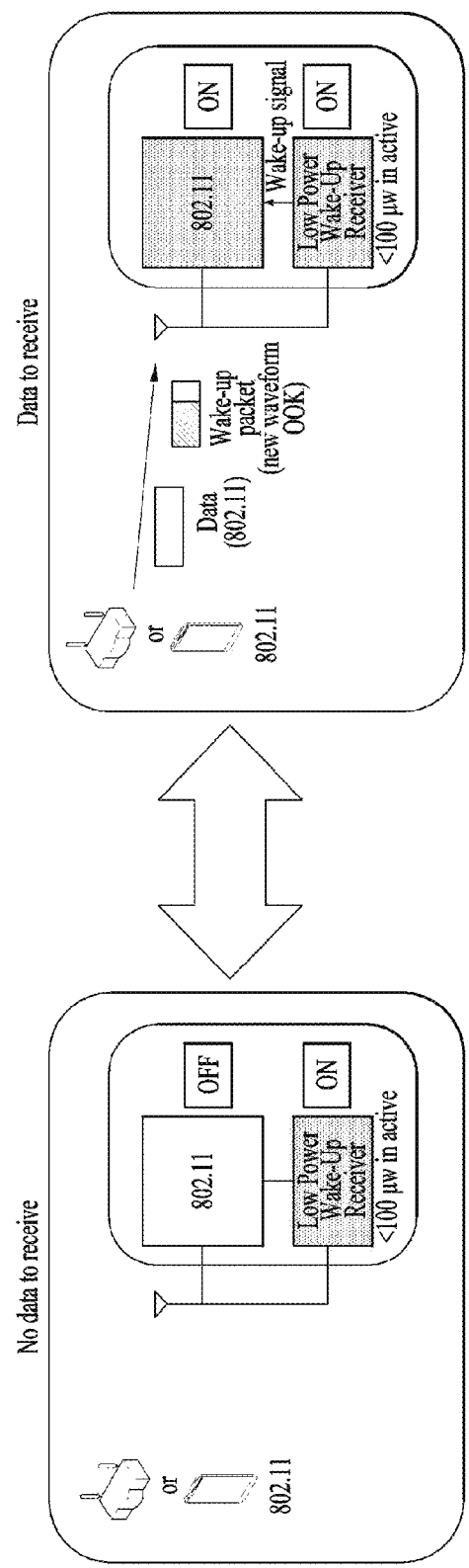
FIG. 11 illustrates an LP-WUR available in a wireless LAN system (e.g., 802.11).

Referring to FIG. 11, a receiver may be configured by combining a wireless LAN (hereinafter referred to as main radio) for main wireless communication and an LP-WUR.

The main radio is used to transmit and receive data and may be powered off when there is no data to be transmitted and received. When the main radio is powered off in this manner, the LP-WUR can wake the main radio up when there is a packet to be received. Accordingly, user data is transmitted and received through the main radio.

The LP-WUR is not used for user data and can serve to wake a receiver of the main radio up. The LP-WUR may have a simple receiver form without having a receiver and is activated while the main radio is turned off. It is desirable that target power consumption of the LP-WUR in an activated state do not exceed 100 μW. For such a low-power operation, a simple modulation method, for example, OOK (on-off keying) may be used and a narrow bandwidth (e.g., 4 MHz or 5 MHz) may be used. A target transmission range (e.g., distance) of the LP-WUR may currently correspond to 802.11.

Figure 12:
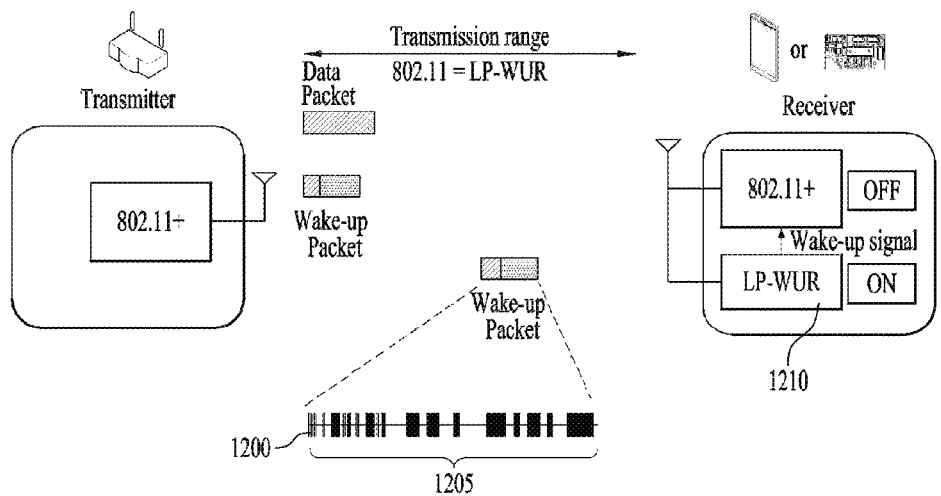
FIG. 12 is a diagram for describing the design and operation of an LP-WUR.

FIG. 12 is a diagram for describing a design and operation of the LP-WUR.

Referring to FIG. 12, a wake-up packet may include a wireless LAN preamble 1200 and a wake-up packet payload 1205.

The wireless LAN preamble 1200 is for coexistence with a wireless LAN system and L-SIG of a wireless LAN can be used as the wireless LAN preamble 1200 for packet protection. Accordingly, a 3rd Party legacy STA can be aware that a wake-up packet is not intended therefor through the wireless LAN preamble 1200 of the wake-up packet and the current medium of the wireless LAN has been occupied by another STA. However, the LP-WUR does not decode the wireless LAN preamble 1200 of the wake-up packet. This is because an LP-WUR supporting narrow bands and OOK demodulation does not support 802.11 signal reception.

The payload of the wake-up packet may be modulated by the OOK scheme. OOK modulation may be performed by modifying an OFDM transmitter. In a WLAN, a phase-shift keying (PSK)-OFDM transmission scheme is used. When a wake-up packet is generated by adding a separate OOK modulator for OOK modulation, costs of implementing a transmitter are increased. Thus, it is possible to generate an OOK-modulated wake-up packet reusing the OFDM transmitter. According to the OOK modulation scheme, a bit value of 1 is modulated into a symbol (i.e., on) having a power of a threshold or greater, and a bit value of 0 is modulated into a symbol (i.e., off) having a power of less than the threshold. On the contrary, it is also possible to define a bit value of 1 as power-off. In the OOK modulation scheme, a bit value of 1/0 is indicated through power-on/off at a corresponding symbol position. This simple OOK modulation/demodulation scheme may reduce power consumption of a receiver for signal detection/demodulation and costs of implementing the scheme.

The wake-up packet may also be referred to as a WUR packet or a WUR part. The WLAN preamble 1200 may be referred to as an L-part.

WUR PPDU

Hereinafter, a WUR PPDU configuration method and/or a WUR PPDU transmission method for transmitting a WUR packet are proposed.

A PPDU may refer to a physical layer (PHY) frame. For convenience, a structure including a WUR preamble and a WUR payload may be defined as a WUR PPDU, actual data for transmission via a WLAN as primary radio (e.g., Wi-Fi) may be referred to as normal data or primary radio data, and a WLAN (e.g., Wi-Fi) PPDU may be referred to as a primary radio PPDU. Embodiments of the present invention will be described based on these definitions of the terms. However, these definitions of the terms are for the convenience of explanation, and other terms may be used. In the following embodiments, a WUR preamble may or may not include a SIG field.

[WUR PPDU Transmission Bandwidth]

A WUR signal (e.g., WUR PPDU) to wake up an 802.11 WLAN receiver may be transmitted using the following bandwidths.

Example 1 of WUR PPDU Transmission Bandwidth

According to an embodiment of the present invention, a WUR PPDU may be transmitted in a 20 MHz bandwidth. For example, a WUR PPDU to wake up an 802.11 STA (e.g., a WLAN receiver) may be transmitted only through a 20 MHz band regardless of a primary radio PPDU of the 802.11 STA or the BW capability of the STA.

The 20 MHz band for WUR PPDU transmission may be a primary 20 MHz channel of a WLAN. Alternatively, the 20 MHz band for WUR PPDU transmission may be a fixed 20 MHz channel, which is different for each BSS, e.g., a dedicated 20 MHz channel set for a WUR.

The primary 20 MHz channel is a channel used to transmit a 20 MHz-size frame and may be neighbor a secondary 20 MHz channel The primary 20 MHz channel and the secondary 20 MHz channel may form a primary 40 MHz channel, and the primary 40 MHz channel may be used to transmit a 40 MHz-size frame. A primary channel and a secondary channel may be distinguished to determine a channel to be preferentially considered in frame transmission and/or a CCA process, which is mentioned in detail in IEEE 802.11 specifications.

In another example, the 20 MHz band for WUR PPDU transmission may be any 20 MHz channel within a bandwidth (BW) for a BSS, and information about the 20 MHz channel for the WUR PPDU may be transmitted to each STA through a beacon frame, a broadcast frame, or the like.

Figure 13:
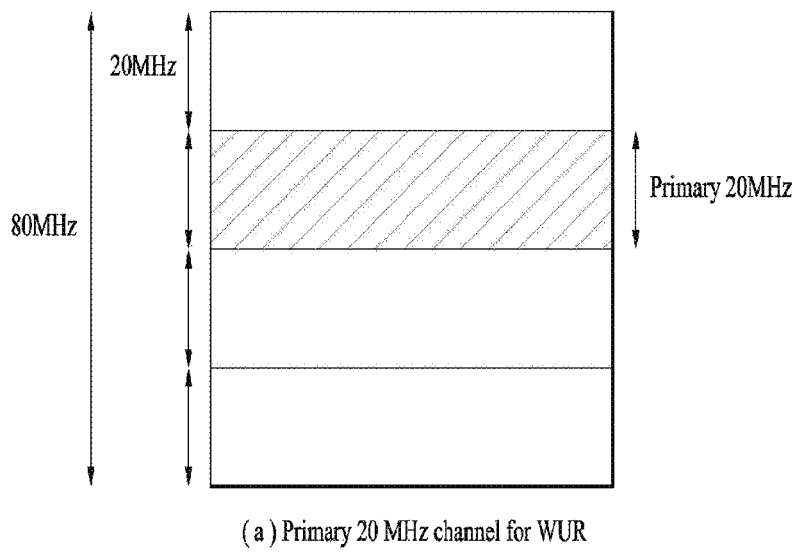
FIG. 13 illustrates a WUR signal transmission bandwidth according to an embodiment of the present invention.
Figure 13:
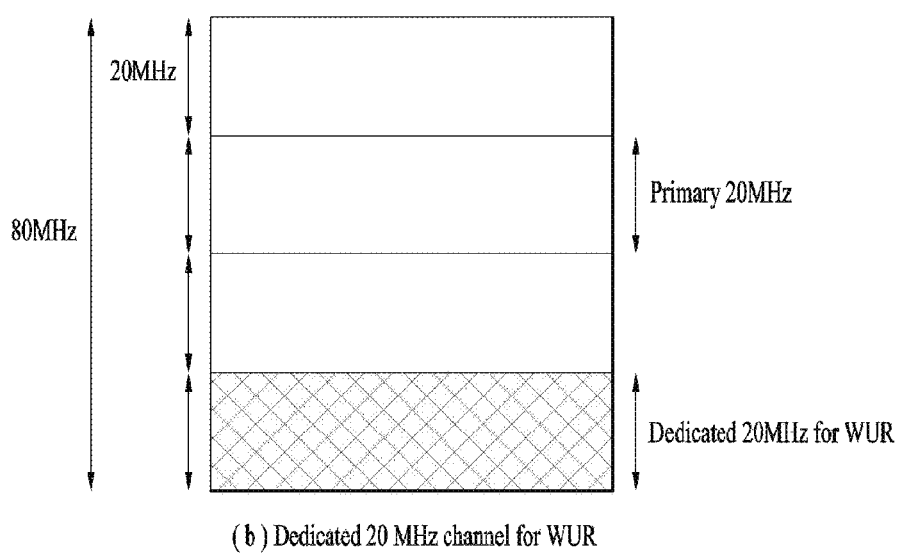

FIG. 13 illustrates a 20 MHz band for WUR PPDU transmission according to an embodiment of the present invention. In FIG. 13, it is assumed that a bandwidth for a WLAN is 80 MHz. In (a) of FIG. 13, the 20 MHz band for WUR PPDU transmission is a primary 20 MHz channel In (b) of FIG. 13(b) the 20 MHz band for WUR PPDU transmission is a WUR-dedicated 20 MHz channel In the example of FIG. 13, a WUR PPDU may also be transmitted using a narrow band within 20 MHz. For example, when an AP/STA transmits a WUR PPDU using IEEE 802.11a OFDM numerology in the 20 MHz band, the WUR PPDU may be transmitted using some tones or subcarriers included in 20 MHz.

When the AP/STA transmits a WUR signal (e.g., a WUR PPDU) only using 20 MHz, the AP/STA may transmit a WUR preamble using a narrow band, for example, some tones/subcarriers, within 20 MHz and may transmit a WUR payload using all available tones/subcarriers in the 20 MHz band.

Example 2 of WUR PPDU Transmission Bandwidth

When an AP/STA transmits a WUR PPDU to wake up another STA and transmits a primary radio PPDU, the AP/STA may transmit the WUR PPDU using a bandwidth signaled for transmitting the primary radio PPDU in order to prevent an overlapping BSS (OSBB)/third-party STA from performing channel access in the bandwidth actually used for transmitting the primary radio PPDU or to reduce interference caused by the OBSS/third-party STA. The bandwidth used for transmitting the primary radio PPDU may be, for example, 20, 40, 80, 160, or 80+80 MHz including the primary 20 MHz channel but is not limited thereto.

When the AP/STA transmits the WUR PPDU using the bandwidth for transmitting the primary radio PPDU, the AP/STA can protect the bandwidth before transmitting the WUR PPDU, thus improving the reliability of the WUR PPDU. For example, the AP/STA that intends to transmit the WUR PPDU can secure a TXOP on the bandwidth for transmitting the primary radio PPDU, thereby preventing another STA from accessing the channel in the bandwidth while transmitting the WUR PPDU.

When the WUR PPDU is transmitted in a narrow band, the power of the WUR PPDU may be detected below the threshold level of CCA or energy detection (ED) of a legacy third-party STA. When the WUR PPDU is transmitted in the narrow band, power density may be lower in the entire channel to be subjected to CCA/ED. In this case, the third-party STA may mistake the bandwidth as being idle and may perform channel access. This problem may be solved if the AP/STA secures in advance the TXOP on the bandwidth for the primary radio PPDU as mentioned above.

An actual transmission bandwidth for the WUR PPDU may be set as follows.

(1) WUR PPDU duplication per 20 MHz channel

Figure 14:
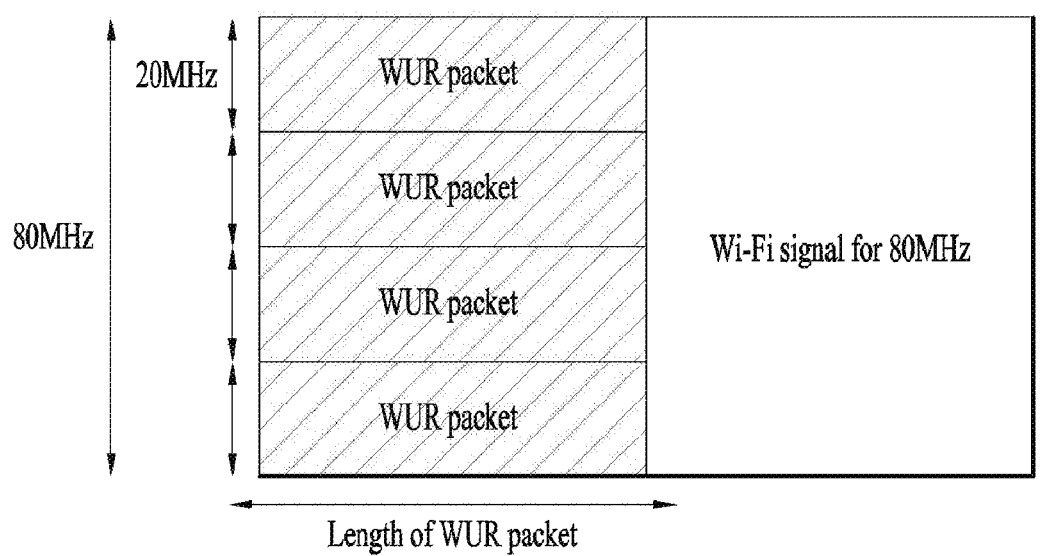
FIG. 14 illustrates a WUR signal transmission bandwidth according to another embodiment of the present invention.

In one example, the WUR PPDU may be basically configured based on a 20 MHz channel, and when a bandwidth for transmitting the primary radio PPDU is larger than 20 MHz, the WUR PPDU may be transmitted by duplication per 20 MHz channel For example, as shown in FIG. 14, when the bandwidth for transmitting the primary radio PPDU is 80 MHz, the same WUR PPDU may be repeatedly transmitted every 20 MHz.

When the same WUR PPDU is repeatedly transmitted every 20 MHz channel, an accumulation gain may be obtained with respect to the WUR PPDU of each 20 MHz channel in wide-band transmission.

For example, the WUR PPDU may be transmitted through the 20 MHz band for WUR signal transmission, and the primary radio PPDU may be transmitted using the entire band. Specifically, when the AP/STA transmits a WUR PPDU in order to transmit an 80 MHz WLAN packet, the WUR PPDU may be transmitted using the 20 MHz band or a narrow band included in 20 MHz and may be repeatedly transmitted every 20 MHz band.

Alternatively, a WUR preamble may be transmitted through a narrow band for WUR signal transmission within 20 MHz, while a WUR payload may be transmitted using the entire band. For example, when the AP/STA transmits a WUR PPDU in order to transmit an 80 MHz WLAN packet, a WUR preamble may be transmitted using a narrow band within 20 MHz and may be repeatedly transmitted every 20 MHz band. Here, a WUR payload may be transmitted through the entire band (i.e., 80 MHz).

(2) Entire-Band Transmission

Figure 15:
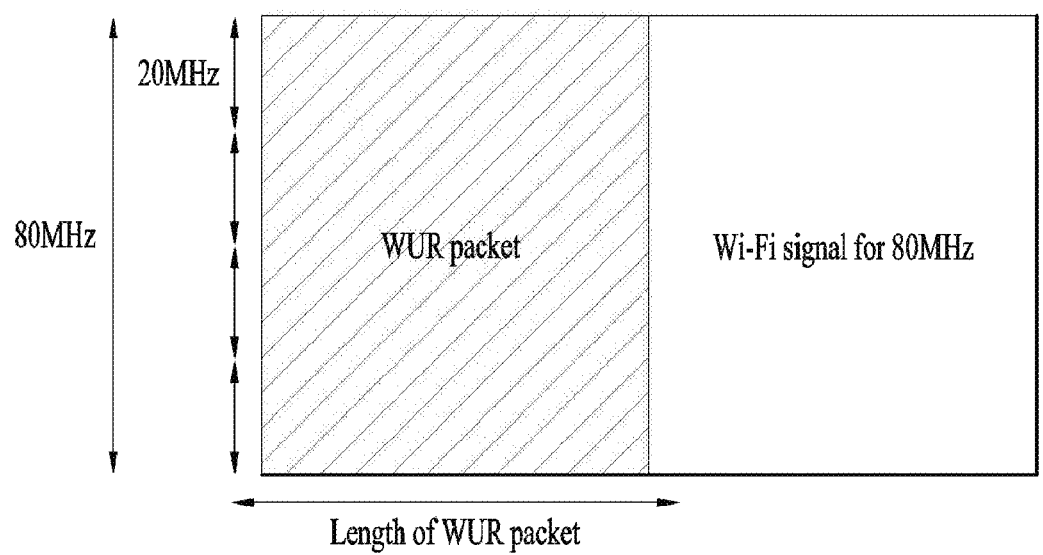
FIG. 15 illustrates a WUR signal transmission bandwidth according to still another embodiment of the present invention.

In another example of the present invention, as shown in FIG. 15, the AP/STA may transmit the WUR PPDU using the entire bandwidth for WLAN data transmission. When the bandwidth for transmitting the primary radio PPDU is, for example, 80 MHz, the WUR PPDU may also be transmitted using the 80 MHz channel band.

Example 3 of WUR PPDU Transmission Bandwidth

According to an embodiment of the present invention, a WUR PPDU may be transmitted using a narrow bandwidth (e.g., <20 MHz).

A WUR PPDU used to reduce the power consumption of a receiver is merely for notifying a STA that there is data to be transmitted and thus does not require a high data rate and requires a robust transmission method to reliably indicate that there is data to be transmitted to a STA. Therefore, a WUR PPDU may be transmitted via a narrow band smaller than a legacy 20 MHz channel Here, the size of the band used for WUR transmission may be, for example, one of 2, 4, 5, 8, and 10 MHz. That is, the narrow band for transmitting the WUR PPDU may be located in a primary 20 MHz channel or in a dedicated 20 MHz channel set for WUR transmission.

For example, OFDM/OFDMA numerology defined for 20, 40, and 80 MHz in IEEE 802.11ax may be used via downscaling as numerology for a narrow band (e.g., 2, 4, 5, 8, and 10 MHz) for transmitting a WUR PPDU. Specifically, when a WUR PPDU is transmitted in a 2 MHz band, numerology for the 2 MHz band may be obtained by downscaling 20 MHz by ten times. When downscaling is performed, the total number of subcarriers included in the 2 MHz bandwidth is equal to the total number of subcarriers included in the 20 MHz bandwidth, but subcarrier spacing is reduced to 1/10. Since the subcarrier spacing is reduced, the length of one symbol in a time domain is increased by ten times. When numerology for an existing WLAN is used via downscaling, the length of a symbol for a WUR PPDU is increased in terms of time to reduce the impact of a channel and the impact of delay spread and/or reflection, thus robustly transmitting the symbol for the WUR PPDU.

Alternatively, conventionally defined OFDM/OFDMA numerology may be used for a narrow bandwidth, and a WUR PPDU may be transmitted using only a subcarrier(s) of the bandwidth. For example, when 802.11a OFDM numerology is used and a narrow band for WUR PPDU transmission is 5 MHz, 16 subcarriers are needed for WUR PPDU transmission. That is, an AP/STA transmits a WUR PPDU using only 16 of the total 64 subcarriers included in 20 MHz.

A WUR PPDU transmitted using some tones/subcarriers may be transmitted by power boosting. A power boosting level may be, for example, $SQRT(M/N)$, where M may be, for example, the total number of tones/subcarriers included in a bandwidth, and N may be the number of tones/subcarriers for WUR PPDU transmission. When the WUR PPDU is transmitted by power boosting, a third-party STA performing CCA/ED in the entire band can recognize that the entire band is busy even though the WUR PPDU is transmitted only through some tones/subcarriers.

When a WUR PPDU is transmitted using a narrow band but a primary radio PPDU needs to be transmitted using a bandwidth greater than 20 MHz, for example, the AP/STA intends to transmit a WLAN PPDU using 80 MHz, the WUR PPDU may be transmitted as follows. In one example, the WUR PPDU may be transmitted only on a primary 20 MHz channel. Alternatively, the WUR PPDU may be transmitted using a dedicated 20 MHz channel Alternatively, the WUR PPDU may be repeatedly transmitted per 20 MHz within the entire bandwidth for primary radio PPDU transmission.

Alternatively, when the AP/STA transmits the primary radio PPDU using a wide bandwidth, the WUR PPDU may be duplicated per narrow band within 20 MHz. Here, each 20 MHz channel may be repeated in the wide bandwidth.

[WUR PPDU Structure]

Hereinafter, examples of a WUR PPDU structure, that is, a WUR PHY frame format, are described. In the following embodiments, a packet extension (PE) part may be included or omitted according to the WUR protocol. It is assumed in the description that a PE is included for convenience, but a PE is not always included behind a frame.

Example 1 of WUR PPDU Structure: L-Part/WUR-Preamble/WUR-SIG/WUR-Payload/PE

Figure 16:
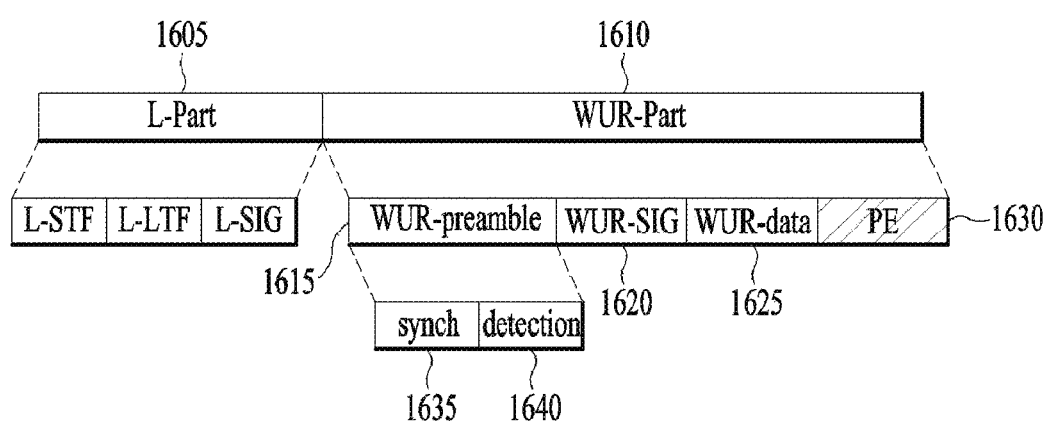
FIG. 16 illustrates a PPDU format of a WUR signal according to an embodiment of the present invention.

FIG. 16 illustrates a WUR PPDU structure according to an embodiment of the present invention. Referring to FIG. 16, a WUR PPDU may include an L-part 1605 and a WUR-part 1610. The WUR-part 1610 may include at least one of a WUR preamble 1615, a WUR SIG field 1620, a WUR payload 1625, and a PE 1630. The WUR preamble 1615 may be for synchronization and detection of a WUR signal, and the WUR SIG field 1620 may be for transmitting system information and control information. The WUR payload 1625 may include control information and an MAC header necessary for WUR transmission rather than actual user data (e.g., WLAN data) to be transmitted to a STA. As mentioned above, the PE 1630 may be included or omitted depending on the embodiment. The PE may be added to maintain a WUR packet size of 6 Mpbs or to secure time to transmit and receive a WLAN signal after transmitting and receiving the WUR PPDU. For example, a STA receiving the WUR PPDU may need a certain period of time to process the WUR PPDU, to wake up a WLAN receiver, and to get ready to receive a WLAN PPDU, and a PE for this preparation time may be included in the WUR PPDU.

The L-part 1605 is for a third-party STA. The STA to receive the WUR PPDU receives and decodes a signal from the WUR preamble without decoding the L-part. Since the L-part is transmitted by an OFDM scheme in a wider band than that for the WUR PPDU, the STA to receive the WUR PPDU starts detection from the WUR-part transmitted by the OOK scheme without decoding the L-part.

The L-part is for preventing interference by another STA, that is, for preventing channel access of the third-party STA, in coexistence with a legacy STA and in WUR transmission. The L-part may include, for example, an L-STF, an L-LTF, and an L-SIG.

L-SIG protection may be performed using a length field of the L-SIG. The length field of the L-SIG may be configured as follows according to the WUR procedure. For example, when an AP/STA transmits WLAN data using a corresponding channel without contention immediately after transmitting the WUR PPDU, the length field of the L-SIG may be configured to include WUR PPDU length+WLAN PPDU length for WLAN data. However, when the AP/STA transmits WLAN PPDU through contention after transmitting the WUR PPDU, the length field of the L-SIG may indicate information about the length of the WUR PPDU.

The L-SIG may be repeatedly transmitted in a time/frequency domain in order to perform L-SIG protection and to enhance the reliability of the L-SIG in the transmission of the WUR PPDU.

The length field of the L-SIG may be set in a unit of 250 kbps, instead of a legacy unit of 6 Mbps, assuming that one bit is transmitted for ¼ us. Thus, the AP/STA may indicate a length in the unit other than the legacy unit, thereby early indicating that the PPDU is a WUR packet.

When the L-SIG is repeatedly transmitted, the AP/STA may early indicate that the PPDU is a WUR packet by the following methods. For example, when the AP/STA transmits the repeated L-SIG multiplied by a polarity of +1/−1, the third-party STA may determine whether the received PPDU is a WUR packet by performing a polarity check. Alternatively, the AP/STA may transmit the repeated L-SIG by applying phase rotation thereto, and the third-party STA may determine whether the received PPDU is a WUR packet based on phase rotation.

Next, the WUR preamble 1615 is explained. In one example, the WUR preamble may include a portion 1635 for time offset correction and time synchronization and a portion 1640 for WUR packet detection. Although FIG. 16 shows that the portion 1635 for time synchronization and the portion 1640 for WUR packet detection are separated, the present invention is not limited thereto. Instead, one WUR preamble sequence may be used for both time synchronization and WUR packet detection.

First, the portion 1635 for time synchronization is explained. The AP/STA may repeatedly transmit a defined WUR sequence in the portion 1635 for time synchronization so that the STA receiving the WUR PPDU can match timing.

The WUR sequence that is repeated in the portion 1635 for time synchronization may be defined using the following methods.

For example, the AP/STA may transmit the WUR PPDU using some subcarriers/tones within a band. When the WUR PPDU is mapped to 13 tones and the OOK modulation scheme is used, one-bit information is converted/spread into a fixed sequence with a length of 13. For example, a one-bit signal may be mapped to 13 tones through a spread sequence with a length of 13. The spread sequence may be a pseudorandom sequence or an orthogonal sequence. According to an embodiment of the present invention, a spread sequence with a length of 13 corresponding to 13 tones may be used for synchronization. For example, the WUR preamble may be configured by repeating the spread sequence. Through the repeated transmission of the WUR sequence, the receiver may perform time synchronization for WUR PPDU reception.

In another example, the AP/STA may transmit the WUR preamble at two-tone or four-tone intervals on tones for transmitting the WUR PPDU within the band. When the WUR preamble is transmitted at two-tone or four-tone intervals in the frequency domain, the WUR preamble is repeated twice or four times in the time domain, thereby enabling time synchronization at the WUR receiver.

In still another example, the AP/STA may set up a sequence for WUR synchronization and may repeatedly transmit the sequence. The sequence for WUR synchronization may be an OOK spread sequence for data bit transmission or a BPSK sequence with a specific length.

A WUR may perform auto/cross-correlation on a received signal and may correct a time offset with reference to the time at which the peak value of each repeated sequence resulting from the correlation is obtained.

The WUR may determine whether the received signal is a WUR packet using the portion 1640 for WUR packet detection. In one example, the AP/STA may transmit a packet detection sequence through the portion 1640 for WUR packet detection, and the WUR may detect a WUR packet by checking the presence or absence of the packet detection sequence. Different packet detection sequences may be set for a single STA and for multiple STAs. Thus, the WUR may determine whether the WUR PPDU is for a single STA or for multiple STAs by detecting the packet detection sequence.

In yet another example, as mentioned above, the WUR preamble 1615 may include one part, and this part may be used for both time offset correction and WUR packet detection. In this case, one WUR preamble sequence may also be repeatedly transmitted through the WUR preamble 1615, and the WUR can perform time offset correction and WUR packet detection using the repeatedly received WUR preamble sequence. For example, the WUR may set a window having a specific length, such as a length corresponding to one WUR preamble sequence among repeated WUR preamble sequences or a length corresponding to a WUR preamble sequence repeated twice or more times, for time offset correction and may measure and correct a time offset for the repeated WUR preamble sequences while changing the window. The WUR may perform WUR packet detection based on the success or failure of decoding a WUR preamble sequence repeated in the received signal.

According to an embodiment of the present invention, the AP/STA may use a signature sequence having specific information as a WUR preamble sequence. For example, the signature sequence may carry a SU/MU indication and information about a bandwidth among information included in the SIG field, and accordingly the AP/STA may early indicate the information. Alternatively, the AP/STA may include information about a frame format in the signature sequence, thereby early indicating information about the configuration of the SIG field to the WUR.

The WUR SIG field 1620 may be omitted or included depending on the embodiment. When the WUR SIG field 1620 is included in the WUR PPDU, the WUR SIG field 1620 may include control information about WUR PPDU transmission. The control information about WUR PPDU transmission may include at least one of STA ID information, a SU/MU indicator, a bandwidth, a symbol number/length field, an ASAP field, PE information, a BSS color, band indication information of a primary radio PPDU, primary radio on/off information, and a primary bandwidth indication, but is not limited thereto.

The STA ID information may include identifier information about a STA that the AP/STA transmitting the WUR PPDU wants to wake up in order to transmit a primary radio PPDU or a STA that needs to receive the primary radio PPDU. For example, the STA ID information may be an AID or a partial AID (e.g., 9 or 11 bits). When the AP/STA performs WUR for a plurality of STAs, the STA ID information may be set to a group ID (GID) (e.g., 6 bits), or the AP/STA may sequentially transmit an AID/partial AID of each of the plurality of STAs instead of using the GID. In another example, the AP/STA may set the STA ID information to a broadcast ID and may transmit ID information of an individual STA through the WUR payload so that all STAs having a WUR capability in a BSS receive the WUR PPDU.

The SU/MU indicator indicates whether the transmitted WUR PPDU is a WUR PPDU for one STA or a WUR PPDU for a plurality of STAs. When the signature sequence of the WUR preamble includes the SU/MU indicator, the WUR SIG field may not include the SU/MU indicator.

The bandwidth information may indicate a bandwidth to be used for transmitting a primary radio PPDU after the WUR PPDU is transmitted. For example, the bandwidth information is information about a bandwidth for transmitting and receiving a WLAN signal and may indicate 20, 40, 80, 160, or 80+80 MHz.

In the symbol number/length field, a length field of the WUR PPDU may indicate information about the length of the WUR packet as the number of symbols. The symbol number/length field may indicate the length of the WUR-part 1610 in the WUR PPDU. The length of symbols may be based on the symbol length of 802.11a or 11ac. When receiving a WUR packet, the WUR may decode the WUR packet only by the length corresponding to the symbols indicated by the symbol number/length field, thus reducing decoding time.

The ASAP field may indicate whether the STA receiving the WUR PPDU needs to contend for access to the WLAN channel. The STA receiving the WUR PPDU may receive a WLAN signal immediately after a certain interval from the receipt of the WUR PPDU according to the indication of the ASAP field.

In order that the STA secures processing time for reception of the primary radio PPDU after receiving the WUR PPDU or in order to prevent the channel access of the third-party STA during the time required for the WLAN receiver to wake up, a symbol for a packet extension (PE) may be added to the end of the WUR PPDU. PE information may indicate the presence or absence of a PE or the length of an extended packet.

The AP/STA may indicate information about a BSS from which the WUR PPDU is transmitted through the BSS color. The STA receiving the WUR PPDU may distinguish the WUR PPDU transmitted by a BSS AP of the STA from a WUR PPDU received from an OBSS through the BSS color.

The band of the primary radio PPDU may be indicated via the WUR PPDU. The WUR PPDU may be transmitted, for example, on a 2.4 GHz or 5 GHz band. On the other hand, since the WUR PPDU is transmitted to wake up the WLAN receiver, the WUR PPDU may not necessarily be transmitted in the same band as that for the primary radio PPDU. In this case, the AP/STA may early indicate information about a band in which the primary radio PPDU is transmitted through the WUR PPDU. Accordingly, the STA receiving the WUR PPDU can avoid unnecessarily sensing a band during the reception of the primary radio PPDU and can reduce preparation time required to receive the primary radio PPDU. The band indication information of the primary radio PPDU may include, for example, one bit and may indicate either 2.4 GHz or 5 GHz. In another example, the band of the primary radio PPDU may be transmitted via a WUR beacon frame or a WLAN beacon frame.

Although the WUR may wake up the WLAN receiver only by envelope detection of the WUR PPDU, primary radio on/off information may be included in the WUR SIG field of the WUR PPDU to prevent the occurrence of an error in envelope detection. For example, primary radio on may be used to transmit and receive WLAN user data through the primary radio (e.g., WLAN), and primary radio off may be used to transmit simple control information to a WUR STA through a frame, such as a null data packet (NDP).

The WUR SIG field may include the primary bandwidth indication. Generally, the STA receiving the WUR PPDU turns off a primary radio receiver. Upon receiving the WUR PPDU, the STA turns on the primary radio receiver and receives the primary radio PPDU. Here, when the WUR PPDU is transmitted through a different band from that of the primary radio PPDU or is transmitted through a dedicated channel (e.g., a channel other than the primary channel of the WLAN), the STA needs to move to the band or channel of the primary radio PPDU in order to receive the primary radio PPDU. In addition, the STA needs to detect a signal in order to find the primary channel of the WLAN. To omit this process, the WUR PPDU may include primary channel information about the primary radio. Upon receiving the primary channel information, the WUR STA may receive the primary radio PPDU through the indicated primary channel.

Figure 17:
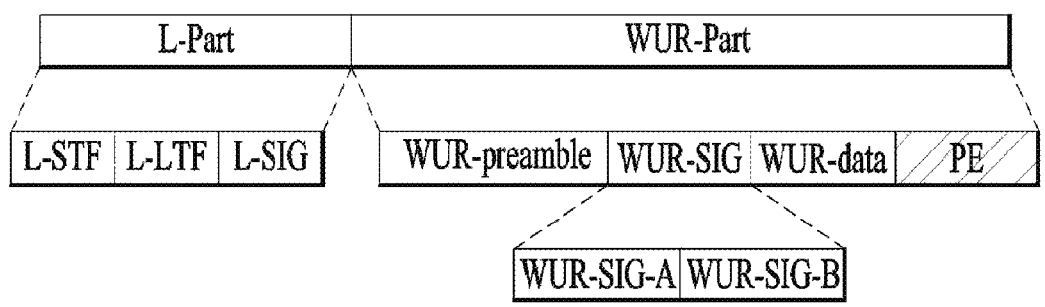
FIG. 17 illustrates a PPDU format of a WUR signal according to another embodiment of the present invention.

Example 2 of WUR PPDU Structure: L-Part/WUR-Preamble/WUR-SIG-A/WUR-SIG-B/WUR-Payload/PE FIG. 17 illustrates a WUR PPDU according to another embodiment of the present invention. Details overlapping with those mentioned in FIG. 16 may be omitted. A WUR preamble may be configured as illustrated in WUR PPDU example 1. However, a WUR SIG may be divided into two parts unlike WUR PPDU example 1. For example, the WUR SIG may include a SIG-A and a SIG-B.

Referring to FIG. 17, the WUR PPDU includes an L-part for reducing interference by a third-party STA and preventing channel access of the third-party STA and a WUR part for WUR packet transmission. Here, the WUR part for WUR packet transmission may include at least one of a WUR preamble, a SIG-A for common control information, a SIG-B for STA-specific control information, WUR data, and a PE. The SIG-A may include information that any STA receiving a WUR signal can decode. The SIG-B may include individual information about a STA. The WUR data may include control information rather than user data of a STA.

For example, the SIG-A may include at least one of a SU/MU indicator, symbol number/length information, bandwidth information, and BSS color information. The SU/MU indicator may indicate whether a WUR packet is for a single STA or for multiple STAs. The symbol number/length information may indicate the length of the SIG-B or the number of symbols for SIG-B transmission. The symbol number/length information may also indicate the number of STAs to wake up using a WUR packet. The bandwidth information may indicate a bandwidth that an AP uses for data transmission in a BSS. The BSS color information may be used to determine whether a WUR packet is transmitted from a BSS to which a STA belongs or from an OBSS.

The SIG-B may be configured for each STA. If the WUR PPDU is for multiple STAs, a plurality of SIG-Bs may be included in the WUR PPDU. Each SIG-B may include STA ID information. A receiving STA may determine whether a WUR packet is for the STA through the STA ID information included in the SIG-B. If ID information about individual STAs is included in the WUR PPDU for a plurality of STAs, a large number of symbols may be required, thus increasing signaling overhead. Therefore, the SIG-B may include a group ID in order to wake up a plurality STAs at the same time. Information included in the SIG-B may change according to the SU/MU indicator of the SIG-A. For example, when a SU is indicated, the SIG-B may include STA ID information. When a MU is indicated, the SIG-B may include GID information.

A WUR SIG field may be configured differently depending on the number of STAs to wake up. For example, when an AP/STA transmits the WUR PPDU to a single STA, the WUR SIG field may configured to include one field (e.g., SIG-A) as in FIG. 16. When the AP/STA transmits WUR PPDU to a plurality of STAs, the WUR SIG field may be configured to include two fields (e.g., SIG-A and SIG-B).

Example 3 of WUR PPDU Structure: L-Part/WUR-Preamble/WUR-Payload/PE

Figure 18:
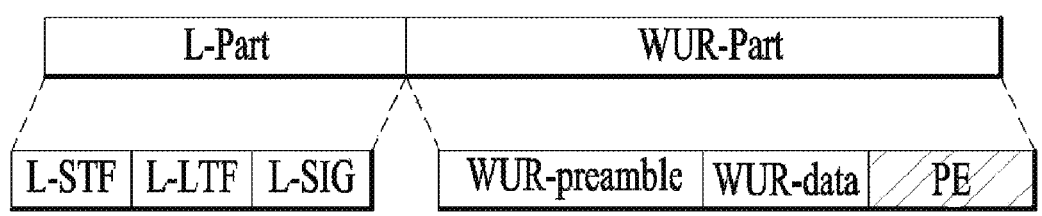
FIG. 18 illustrates a PPDU format of a WUR signal according to still another embodiment of the present invention.

FIG. 18 illustrates a WUR PPDU structure according to still another embodiment of the present invention. Details overlapping with those mentioned above may be omitted.

In FIG. 18, a WUR data (e.g., payload) part includes control information rather than user data for a STA. A WUR part includes a WUR preamble and the WUR payload part.

The WUR preamble is used for time synchronization and detection of a WUR signal and may be configured as examples 1 and 2 of the WUR PPDU structure. The WUR preamble may also include a signature sequence. For example, SU/MU information and information a bandwidth for a WLAN may be early indicated through the signature sequence of the WUR preamble. The WUR preamble may also include a STA-ID/Partial AID for early indication.

The WUR preamble sequence may be a sequence for broadcasting. Therefore, all WUR STAs may wake up to receive the WUR preamble, may then decode a WUR payload, and may determine whether a WUR PPDU is for the STAs.

Since the WUR payload includes only the control information rather than the user data, a separate SIG field for the control information does not need to be included in the WUR PPDU. The STA may perform synchronization for WUR PPDU reception and may detect the WUR PPDU through the WUR preamble. The STA may then decode the WUR payload transmitted after the WUR preamble, thereby obtaining the control information, which is included in the SIG field in examples 1 and 2 illustrated above.

In this example, the STA obtains the control information using the WUR payload instead of the SIG field and thus needs to decode data in order to identify information about the STA.

Example 4 of WUR PPDU Structure: L-Part/WUR-Preamble/WUR-SIG/PE

In example 4, a WUR payload may be omitted and a WUR SIG field for transmitting control information may be included instead in a WUR PPDU, unlike example 3 in which the WUR payload includes only the control information. A STA may perform synchronization for the WUR PPDU and packet detection using a WUR preamble and may determine whether a WUR packet is for the STA through the control information included in the WUR SIG.

The WUR SIG may include the information of the SIG field described in examples 1 and 2. Since all the control information needed for transmitting the WUR packet is transmitted through the SIG field, the STA does not need to decode a WUR payload and thus can quickly process a WUR signal.

The WUR SIG may be configured to include one part or may be configured to include two parts. For example, when the WUR SIG includes one part, the WUR SIG may include common control information as described above in the WUR-SIG A. When the WUR SIG includes two parts, the WUR SIG may include a SIG-A for common control information and a SIG-B including information for each STA. The configuration of the WUR SIG may also change depending on a SU/MU. For example, for a SU, the WUR SIG may be configured to include one part. For a MU, the WUR SIG may be configured to include two parts.

Example 5 of WUR PPDU Structure: L-Part/WUR-Preamble/PE

According to yet another embodiment of the present invention, a WUR PPDU may include an L-part and a WUR preamble. The WUR PPDU may be transmitted for a broadcast WUR call as an NDP frame of an existing WLAN. Here, the WUR preamble may be broadcasted.

Since the WUR preamble is used for broadcasting, a WUR STA receiving the WUR PPDU wakes up a primary radio receiver to receive a primary radio PPDU. The WUR STA determines whether the primary radio PPDU is a signal for the WUR STA.

An ID for the broadcast WUR call may be included in the WUR preamble, or an AP/STA may configure the WUR preamble using a particular sequence so that all WUR STAs in a BSS receive the WUR PPDU.

The sequence of the WUR preamble may be a predetermined sequence for broadcasting wake-up.

The WUR PPDU according to this example may be used to prevent interference caused by an OBSS and transmission of the primary radio PPDU and to prevent channel access of a third-party STA. Here, the WUR preamble may include BSS ID/BSS color information.

Example 6 of WUR PPDU Structure

Figure 19:
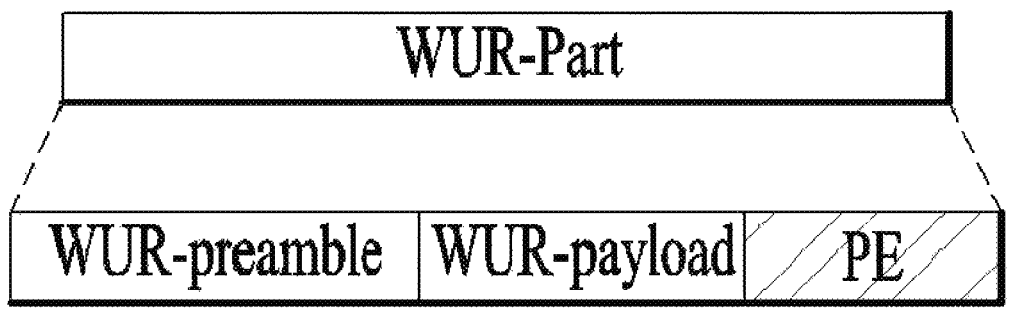
FIG. 19 illustrates a PPDU format of a WUR signal according to yet another embodiment of the present invention.
Figure 20:
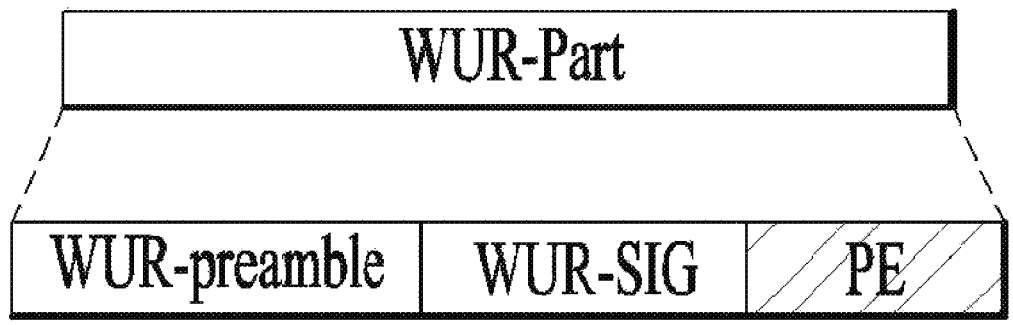
FIG. 20 illustrates a PPDU format of a WUR signal according to still another embodiment of the present invention.

According to still another embodiment of the present invention, as shown in FIG. 19 or FIG. 20, a WUR PPDU may include only a WUR part without an L-part. For example, the WUR PPDU may include a WUR preamble, a WUR payload, and a PE, may include a WUR preamble, a WUR SIG, and a PE, may include a WUR preamble, a WUR SIG, a WUR payload, and a PE, or may include a WUR preamble and a PE.

The WUR PPDU having no L-part starts with a WUR preamble for WUR synchronization and WUR packet detection, and the WUR preamble may be configured as a repeated sequence for synchronization. Control information and ID information for WUR signal transmission may be transmitted using a WUR SIG field or using a WUR payload.

In another example, when the WUR PPDU includes only a WUR preamble without a WUR SIG and a WUR payload, an AP/STA may transmit a broadcast ID via the WUR preamble or may transmit a sequence indicating the broadcast ID through the WUR preamble.

In order to transmit a WUR signal according to this format, both the STA and the AP access a channel through random access. Since the WUR PPDU includes no L-part, a third-party STA/AP other than the STA/AP that transmits and receives the WUR signal may determine whether the WUR PPDU is transmitted via the channel using a CCA-ED level. Considering that the third-party AP/STA performs CCA for 20 MHz, power for the WUR PPDU transmitted in a narrow band may be boosted. The STA/AP transmitting or receiving the WUR PPDU may perform CCA for 20 MHz or may perform CCA for a band in which the WUR PPDU is transmitted. When the STA/AP performs CCA in a narrow band, a CCA-ED value for the narrow band may be illustrated in Table 1 or Table 2.

TABLE 1

| BW | CCA-ED level |
| --- | --- |
| 20 MHz | −62 dBm |
| 10 MHz | −65 dBm |
| 5 MHz | −68 dBm |

TABLE 2

| BW | CCA-ED level |
| --- | --- |
| 20 MHz | −72 dBm |
| 10 MHz | −75 dBm |
| 5 MHz | −78 dBm |

The CCA-ED values in Table 1 and Table 2 are merely examples, and other CCA-ED values may be applied to the present invention.

[Frequency Sequence for WUR PPDU]

A WUR determines whether a received signal shows energy at a particular position in the time domain, thereby determining whether a WUR signal (e.g., a WUR PPDU) is detected. Therefore, a frequency sequence for achieving time synchronization for a WUR signal is required, and it is necessary to clearly distinguish a WUR preamble from WUR data in transmission of the WUR signal.

In view of these requirements, a frequency sequence for a WUR signal will be described hereinafter.

A WUR may perform auto-correlation on a WUR signal for WUR synchronization. In order that the WUR accurately achieves time synchronization using a WUR preamble, a sequence used for an OOK symbol of the WUR preamble needs to have a high peak value in auto-correlation. To this end, a sequence having a high auto-correlation in terms of frequency, for example, a Cazac-sequence, a Zadoff-Chu sequence, and a Golay sequence, may be used as a WUR preamble sequence. Here, the length of the WUR preamble sequence may be longer than that of a frequency sequence used to transmit WUR data/WUR control information.

For example, an OOK frequency sequence used for a WUR preamble may be a sequence having a relatively long length, and an OOK frequency sequence for WUR data/control information may be a sequence having a relatively short length.

In one example, the OOK frequency sequence for WUR data/control information may be a portion of the OOK frequency sequence used for the WUR preamble.

Specifically, it is assumed that the length of the frequency sequence used for transmitting the WUR preamble (hereinafter, 'P_seq') is 26 and the length of the frequency sequence used for WUR data/control information (hereinafter, 'S_seq') is 13. For example, a portion of P_seq that starts from the left or right side of P_seq and corresponds to the length of S_seq may be used as S_seq. Alternatively, a portion of P_seq that starts from the center of P_seq and corresponds to the length of S_seq may be used as S_seq. When the length of P_seq is 26, S_seq may be a sequence corresponding to indexes of {26/2−6: 26/2+6} in P_seq. Alternatively, a subsequence having the smallest PAPR value within P_seq may be used as S_seq.

As a sequence for a WUR preamble and a sequence for WUR data/control information are configured to have different lengths, it is possible to improve time synchronization performance using the WUR preamble and an STA can easily divide a received WUR PPDU into a WUR preamble and WUR data/control information.

When a sequence for a WUR preamble and a sequence for WUR data/control information are configured to have different lengths, different ED levels may be set for detection of respective signals. For example, since a longer frequency sequence is configured for a WUR preamble, the STA may determine whether a signal is transmitted using a higher ED level than an ED level for WUR data/control information.

When a sequence for WUR data/control information is a portion of a sequence for a WUR preamble, the portion of the sequence for the WUR preamble may be subjected to phase sifting or cyclic shifting, thereby obtaining a sequence for WUR data/control information.

In another example, when a sequence having a high auto-correlation is used as a frequency sequence for OOK signal transmission (hereinafter, 'OOK-seq') in view of time synchronization, OOK-seq may be a long sequence having a high peak value for accurate time synchronization. For example, when a WUR signal is transmitted using 11a OFDM 20 MHz numerology, the length of the long sequence may be greater than 13 and less than 52.

Figure 21:
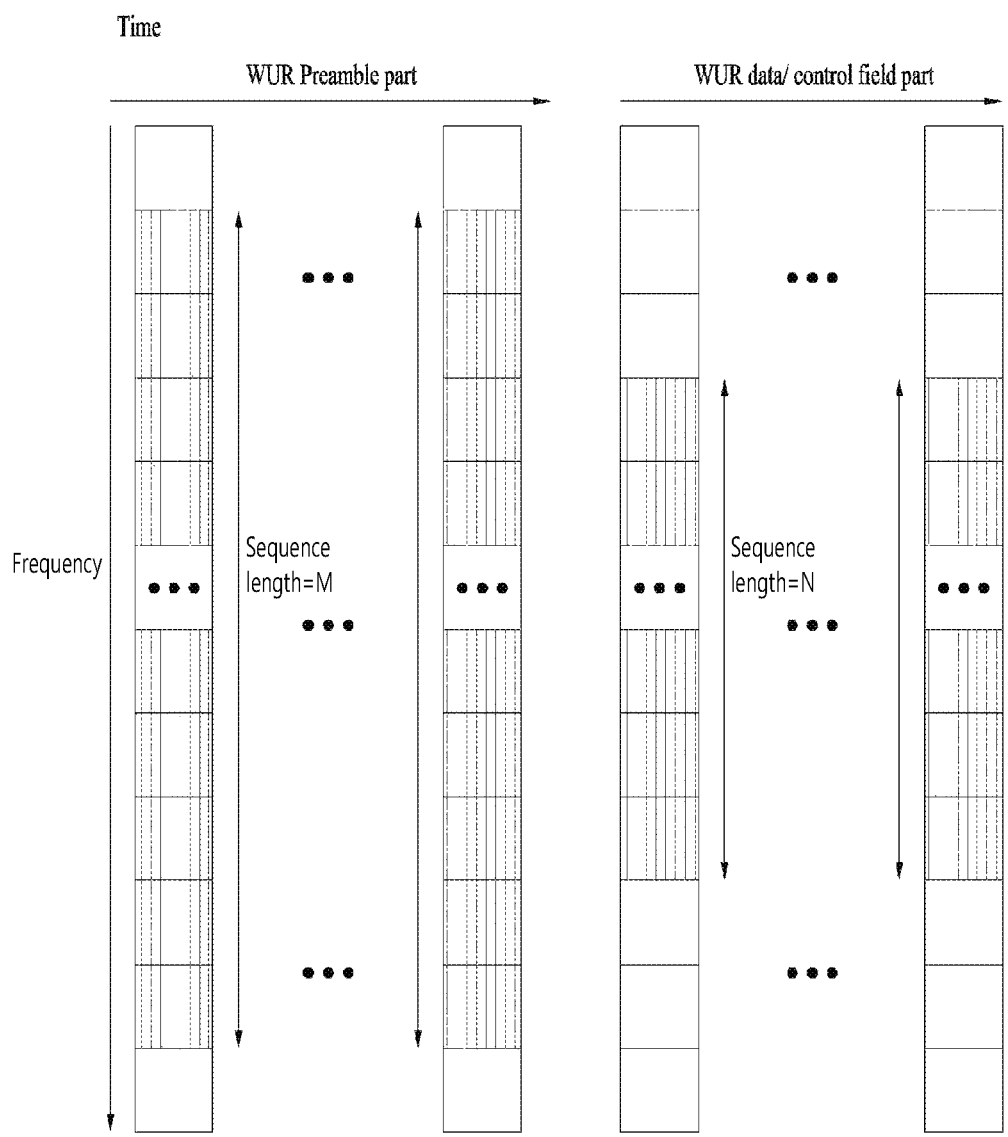
FIG. 21 illustrates a frequency sequence of a WUR signal according to an embodiment of the present invention.

FIG. 21 illustrates an OOK sequence for OOK symbol transmission according to an embodiment of the present invention.

OOK-seq may have a length of M defined for OOK symbol transmission. When a WUR preamble is transmitted, OOK-seq may be transmitted through M tones. When WUR data/control information is transmitted, OOK-seq may be transmitted through N tones, where N is smaller than M, and no OOK-seq may be transmitted through M-N tones.

For example, when the number of tones available for WUR PPDU transmission is M, an AP/STA may transmit a WUR preamble using total M tones and may transmit WUR data/control information using N tones, where N is smaller than M.

Figure 22:
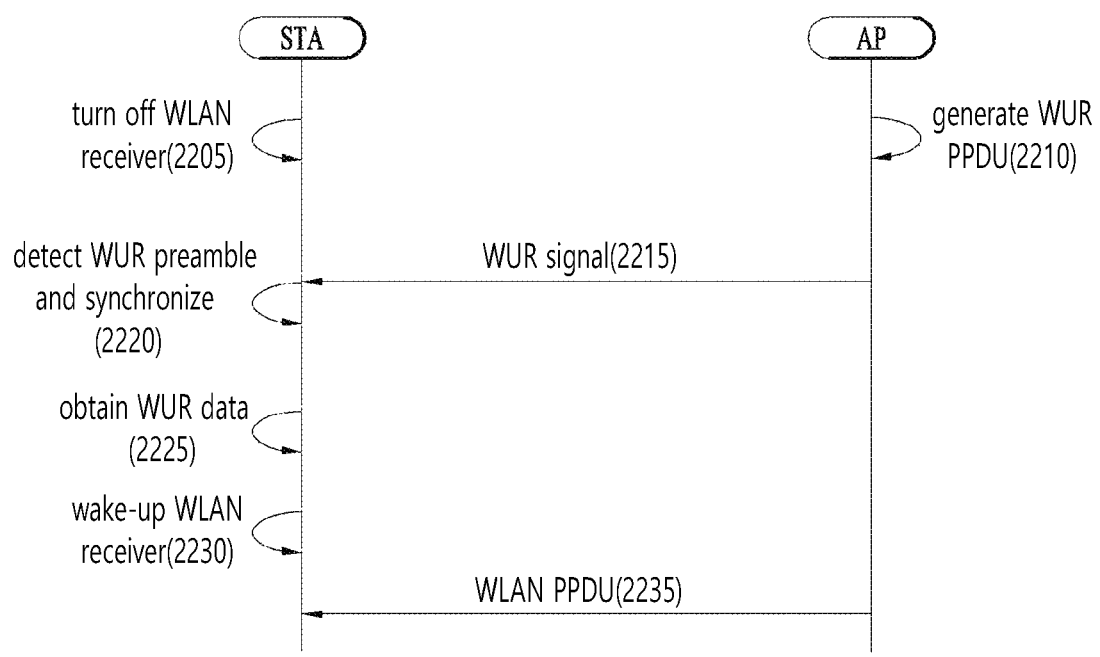
FIG. 22 illustrates the flow of a method for transmitting and receiving a WUR signal according to an embodiment of the present invention.
Figure 23:
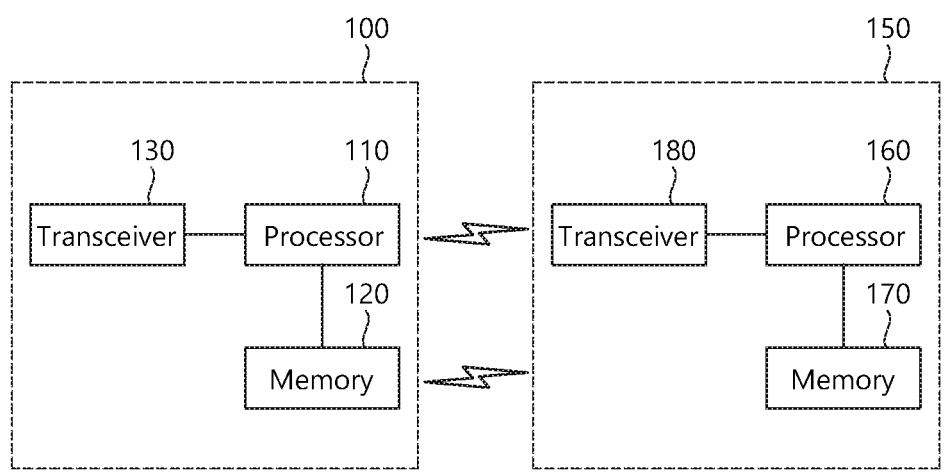
FIG. 23 illustrates a device according to an embodiment of the present invention.

FIG. 22 illustrates the flow of a method for transmitting and receiving a WUR signal according to an embodiment of the present invention. Details overlapping with those described above may be omitted.

Referring to FIG. 22, a STA turns off a WLAN receiver (2205). With the WLAN receiver turned off, the STA may monitor a narrow band for WUR PPDU reception through a WUR.

An AP generates a WUR PPDU including a WUR preamble sequence and WUR data (2210).

The AP transmits the WUR PPDU to the WUR of the STA with the WLAN receiver turned off (2215).

The STA detects the WUR preamble sequence included in the WUR PPDU through the WUR of the STA while the WLAN receiver is turned off (2220). The STA performs synchronization through the WUR preamble sequence. For example, the STA corrects a time offset through a WUR preamble.

The STA obtains the WUR data included in the WUR PPDU based on a time synchronized through the WUR preamble sequence (2225).

When the WUR data is intended for the STA, the STA outputs a wake-up signal to the WLAN receiver through the WUR of the STA (2230).

The AP transmits a WLAN PPDU to the STA after the WUR of the STA wakes up the WLAN receiver (2235).

The WUR preamble sequence used for WUR synchronization may correspond to a signature sequence carrying particular information. The particular information may include at least one of a SU/MU indicator indicating whether the WUR PPDU is for an SU or for an MU and information about a bandwidth for a WLAN PPDU that the WLAN receiver receives after waking up.

The STA may receive the WUR preamble sequence through a narrow band narrower than the bandwidth for the WLAN PPDU. The narrow band may be a portion of subcarriers comprised in a WLAN primary 20 MHz channel or a WUR-dedicated 20 MHz channel.

Power for the WUR preamble may be boosted according to an equation of SQRT(M/N), where SQRT may denote a square root, M may denote the total number of subcarriers comprised in the 20 MHz channel, and N may denote the total number of subcarriers comprised in the narrow band.

The WUR preamble sequence may be repeated a plurality of times in the WUR PPDU. For example, the WUR preamble sequence may be a spread sequence with a length of N for on-off keying modulation mapping of one bit of the WUR data to N subcarriers, and the WUR preamble sequence (e.g., the spread sequence with the length of N) may be repeated a plurality of times in a time domain. Alternatively, the WUR preamble sequence may be mapped and transmitted at a two-subcarrier or four-subcarrier interval in N subcarriers mapped to the WUR data and may thus be repeated two or four times in the time domain. N may be 13.

The particular information may further include at least one of an ID of the STA, a broadcast ID, and a BSS ID.

FIG. 18 is a diagram for describing a device for realizing the above-described method.

A wireless device 800 shown in FIG. 18 may correspond to a specific STA described above and a wireless device 850 may correspond to an AP described above.

The STA 800 may include a processor 810, a memory 820 and a transceiver 830 and the AP 850 may include a processor 860, a memory 870 and a transceiver 880. The transceivers 830 and 880 may transmit/receive wireless signals and may be implemented the physical layer such as IEEE 802.11/3GPP. The processor 810 and 860 are implemented in the physical layer and/or the MAC layer and connected to the transceivers 830 and 880. The processors 810 and 860 may perform the aforementioned UL MU scheduling procedure.

The processors 810 and 860 and/or the transceivers 830 and 880 may include an application-specific integrated circuit (ASIC), other chipsets, a logic circuit and/or a data processor. The memories 820 and 870 may include read-only memory (ROM), a random access memory (RAM), a flash memory, a memory card, a storage medium and/or other storage units. When an embodiment is executed by software, the above-described method may be performed by modules (e.g., a processor and a function) which perform the above-described functions. The modules may be stored in the memories 820 and 870 and executed by the processors 810 and 860. The memories 820 and 870 may be disposed inside or outside of the processors 810 and 860) and connected to the processors 810 and 860 through a known means.

The transceiver 830 of the STA may include a transmitter (not shown) and a receiver (not shown). The receiver may include a wireless LAN receiver for receiving wireless LAN signals and a WUR receiver for receiving WUR signals.

The transceiver 880 of the AP may include a transmitter (not shown) and a receiver (not shown). The transmitter of the AP may correspond to an OFDM transmitter. The AP may transmit a WUR payload according to OOK by reusing the OFDM transmitter. For example, the AP may OOK-modulate the WUR payload through the OFDM transmitter, as described above.

In the above exemplary systems, although the methods have been described on the detailed description of the preferred embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The present invention can be applied to various wireless communication systems including IEEE 802.11.

What is claimed is:

1. A method for receiving a wake-up receiver (WUR) signal by a station (STA) in a wireless local area network (WLAN) system, the method comprising:
    detecting a WUR preamble sequence comprised in a WUR physical layer protocol data unit (PPDU) through a WUR of the STA while a WLAN receiver of the STA is turned off;
    obtaining WUR data comprised in the WUR PPDU based on a time synchronized through the WUR preamble sequence; and
    outputting a wake-up signal to the WLAN receiver through the WUR of the STA when the WUR data is intended for the STA,
    wherein the WUR preamble sequence used for synchronization is a signature sequence carrying particular information,
    wherein the particular information comprises at least one of a single user (SU)/multi-user (MU) indicator indicating whether the WUR PPDU is for an SU or for an MU and information about a bandwidth for a WLAN PPDU that the WLAN receiver receives after waking up,
    wherein the WUR preamble sequence is received through a narrow band narrower than the bandwidth for the WLAN PPDU,
    wherein the narrow band is a portion of subcarriers comprised in a WLAN primary 20 MHz channel or a WUR-dedicated 20 MHz channel, and
    wherein power for the WUR preamble is boosted according to an equation of SQRT(M/N), where SQRT denotes a square root, M denotes a total number of subcarriers comprised in the 20 MHz channel, and N denotes a total number of subcarriers comprised in the narrow band.

2. The method of claim 1, wherein the WUR preamble sequence is repeated a plurality of times in the WUR PPDU.

3. The method of claim 2, wherein the WUR preamble sequence is a spread sequence with a length of N for on-off keying modulation mapping of one bit of the WUR data to N subcarriers, and the spread sequence with the length of N is repeated a plurality of times in a time domain.

4. The method of claim 2, wherein the WUR preamble sequence is mapped at a two-subcarrier or four-subcarrier interval in N subcarriers mapped to the WUR data and is repeated two or four times in a time domain.

5. The method of claim 1, wherein the particular information further comprises at least one of an ID of the STA, a broadcast ID, and a basic service set (BSS) ID.

6. A station (STA) receiving a wake-up receiver (WUR) signal in a wireless local area network (WLAN) system, the STA comprising:
    a WLAN receiver; and
    a WUR configured to detect a WUR preamble sequence comprised in a WUR physical layer protocol data unit (PPDU) while the WLAN receiver is turned off, to obtain WUR data comprised in the WUR PPDU based on a time synchronized through the WUR preamble sequence, and to output a wake-up signal to the WLAN receiver when the WUR data is intended for the STA,
    wherein the WUR preamble sequence used for synchronization is a signature sequence carrying particular information,
    wherein the particular information comprises at least one of a single user (SU)/multi-user (MU) indicator indicating whether the WUR PPDU is for an SU or for an MU and information about a bandwidth for a WLAN PPDU that the WLAN receiver receives after waking up,
    wherein the WUR preamble sequence is received through a narrow band narrower than the bandwidth for the WLAN PPDU,
    wherein the narrow band is a portion of subcarriers comprised in a WLAN primary 20 MHz channel or a WUR-dedicated 20 MHz channel, and
    wherein power for the WUR preamble is boosted according to an equation of SQRT(M/N), where SQRT denotes a square root, M denotes a total number of subcarriers comprised in the 20 MHz channel, and N denotes a total number of subcarriers comprised in the narrow band.

7. A method for transmitting a wake-up receiver (WUR) signal by an access point (AP) in a wireless local area network (WLAN) system, the method comprising:
    generating a WUR physical layer protocol data unit (PPDU) comprising a WUR preamble sequence and WUR data;
    transmitting the WUR PPDU to a WUR of a station (STA) with a WLAN receiver turned off; and
    transmitting a WLAN PPDU to the STA after the WUR of the STA wakes up the WLAN receiver,
    wherein the WUR preamble sequence used for synchronization between the WUR receiver of the STA and the AP is a signature sequence carrying particular information,
    wherein the particular information comprises at least one of a single user (SU)/multi-user (MU) indicator indicating whether the WUR PPDU is for an SU or for an MU and information about a bandwidth for a WLAN PPDU that the WLAN receiver transmits after waking up,
    wherein the WUR preamble sequence is received through a narrow band narrower than the bandwidth for the WLAN PPDU,
    wherein the narrow band is a portion of subcarriers comprised in a WLAN primary 20 MHz channel or a WUR-dedicated 20 MHz channel, and
    wherein power for the WUR preamble is boosted according to an equation of SQRT(M/N), where SQRT denotes a square root, M denotes a total number of subcarriers comprised in the 20 MHz channel, and N denotes a total number of subcarriers comprised in the narrow band.

8. The method of claim 7, wherein the WUR preamble sequence is repeated a plurality of times in the WUR PPDU.

9. The method of claim 8, wherein the WUR preamble sequence is a spread sequence with a length of N for on-off keying modulation mapping of one bit of the WUR data to N subcarriers, and the spread sequence with the length of N is repeated a plurality of times in a time domain.

10. The method of claim 8, wherein the WUR preamble sequence is mapped at a two-subcarrier or four-subcarrier interval in N subcarriers mapped to the WUR data and is repeated two or four times in a time domain.

11. The method of claim 7, wherein the particular information further comprises at least one of an ID of the STA, a broadcast ID, and a basic service set (BSS) ID.

\* \* \* \* \*